United States Patent
Odagiri

(10) Patent No.: US 8,411,976 B2
(45) Date of Patent: Apr. 2, 2013

(54) IMAGE DATA COMPRESSION APPARATUS, DECOMPRESSION APPARATUS, COMPRESSING METHOD, DECOMPRESSING METHOD, AND STORAGE MEDIUM

(75) Inventor: Junichi Odagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 12/887,014

(22) Filed: Sep. 21, 2010

(65) Prior Publication Data

US 2011/0013854 A1 Jan. 20, 2011

Related U.S. Application Data

(63) Continuation of application No. PCT/JP2008/000836, filed on Mar. 31, 2008.

(51) Int. Cl.
G06K 9/46 (2006.01)
G06K 9/36 (2006.01)

(52) U.S. Cl. .................................. 382/238; 382/240

(58) Field of Classification Search .................. None
See application file for complete search history.

(56) References Cited

U.S. PATENT DOCUMENTS

| | | | |
|---|---|---|---|
| 4,630,124 A | 12/1986 | Endoh et al. | |
| 5,475,501 A * | 12/1995 | Yagasaki | 382/250 |
| 5,960,116 A * | 9/1999 | Kajiwara | 382/238 |
| 6,028,637 A | 2/2000 | Sugiyama | |
| 6,072,830 A * | 6/2000 | Proctor et al. | 375/240.22 |
| 6,292,591 B1 | 9/2001 | Kondo | |
| 6,442,297 B1 * | 8/2002 | Kondo et al. | 382/240 |
| 6,633,677 B1 * | 10/2003 | Dube et al. | 382/238 |
| 2002/0150164 A1 * | 10/2002 | Felts et al. | 375/240.19 |
| 2002/0168105 A1 * | 11/2002 | Li | 382/170 |
| 2006/0013316 A1 * | 1/2006 | Fandrianto et al. | 375/240.24 |
| 2007/0053431 A1 * | 3/2007 | Cammas et al. | 375/240.12 |
| 2007/0121731 A1 * | 5/2007 | Tanizawa et al. | 375/240.24 |

FOREIGN PATENT DOCUMENTS

| | | |
|---|---|---|
| JP | 60-87570 | 5/1985 |
| JP | 60-127875 | 7/1985 |

(Continued)

OTHER PUBLICATIONS

Li et al., "Edge-Directed Prediction for Lossless Compression of Natural Images" IEEE Transactions on Image Processing, vol. 10, No. 6, Jun. 2001, pp. 813-817.*

(Continued)

*Primary Examiner* — Wenpeng Chen
*Assistant Examiner* — Feng Niu
(74) *Attorney, Agent, or Firm* — Staas & Halsey LLP

(57) ABSTRACT

An image compression apparatus includes: a line memory unit for holding pixel values for at least one immediately previous line in the lines to be processed of an image to be compressed; a division unit for dividing pixels of the line to be processed into $2^n$-pixel blocks; a first estimation value calculation unit for extrapolation-estimating the $2^{n-1}$-th pixel and the $2^n$-th pixel in the blocks divided, and obtaining an estimated value in processing for the first hierarchical level; a second estimation value calculation unit for interpolation-estimating certain pixels and obtaining an estimated value in the processing for the second hierarchical level through the processing for the n-th hierarchical level; and an estimation coding unit for obtaining an estimation error from the estimated value, converting the estimation error into a quantization number, converting the quantization number into a variable length code, and obtaining a compression code.

17 Claims, 30 Drawing Sheets

FOREIGN PATENT DOCUMENTS

| | | |
|---|---|---|
| JP | 62-264785 | 11/1987 |
| JP | 10-84548 | 3/1998 |
| JP | 10-136376 | 5/1998 |

OTHER PUBLICATIONS

Kim et al., "Hierarchy Embedded Differential Image for Progressive Transmission Using Lossless Compression" IEEE Traksactions on Circuits and Systems for Video Technology. Vol. 5, No. 1, Feb. 1995, pp. 1-13.*

Weinberger et al., "The LOCO-I Lossless Image Compression Algorithm: Principles and Standardization into JPEG-LS" IEEE Transactions on Image Processing, vol. 9, No. 8, Aug. 2000, pp. 1309-1324.*

International Search Report for PCT/JP2008/000836, mailed Jul. 15, 2008.

* cited by examiner

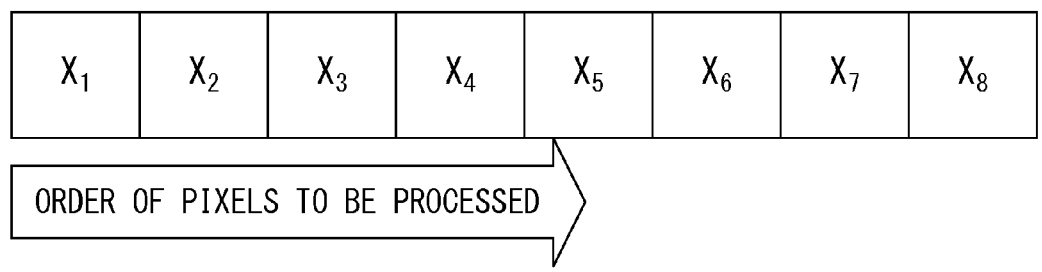
F I G. 5 A

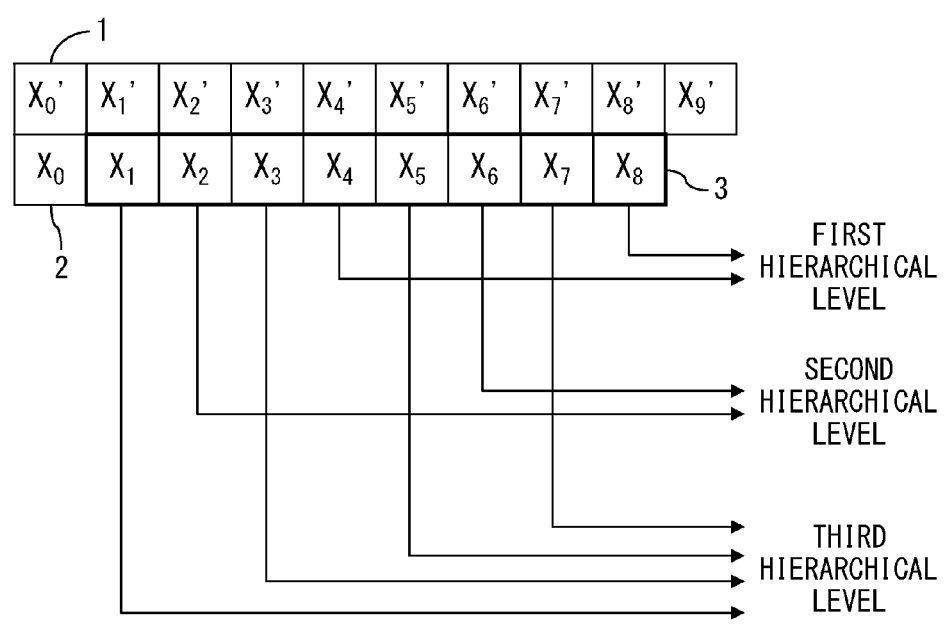
F I G. 8

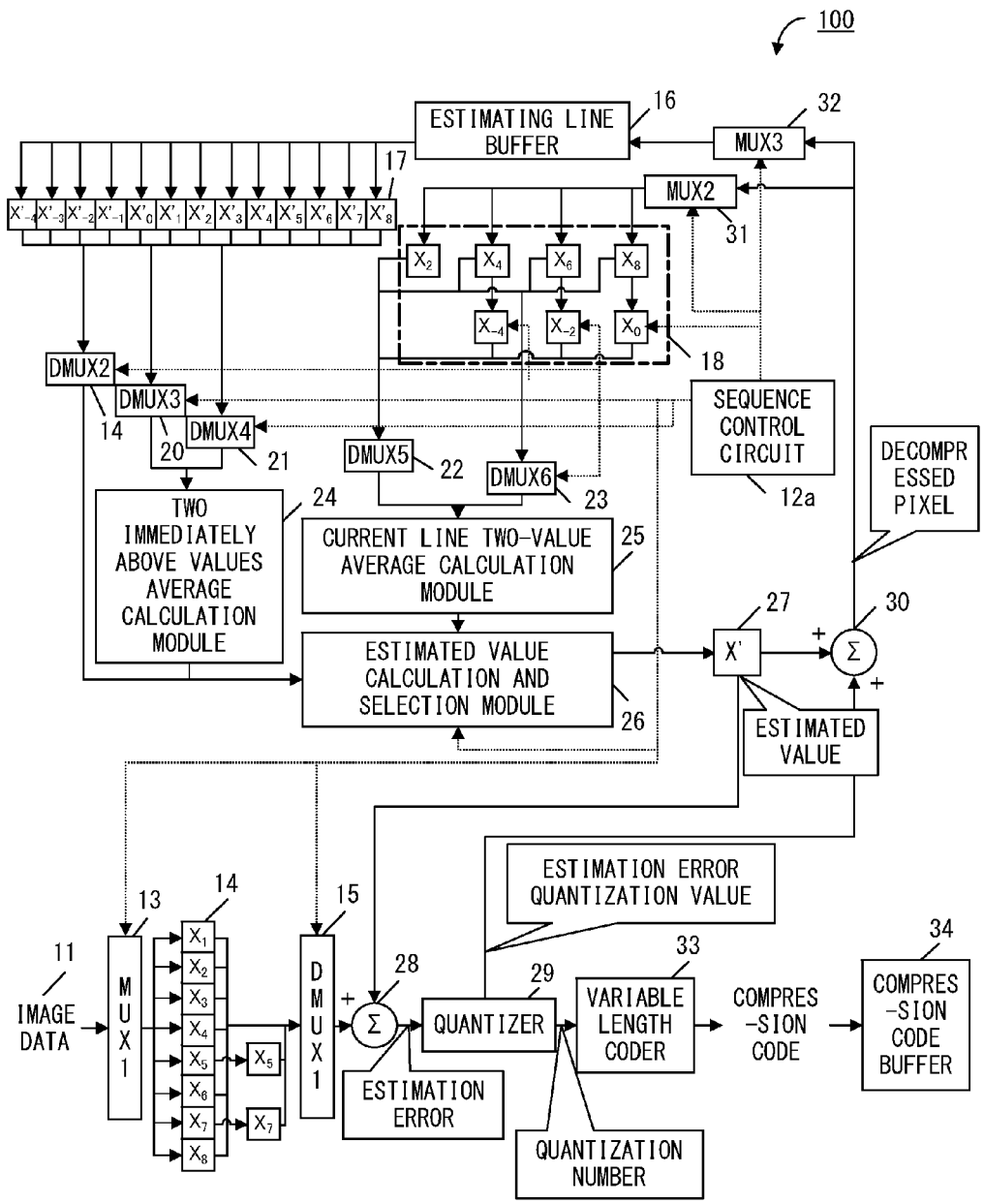
F I G. 1 1

| ESTIMATION TARGET | | REFERENCE VALUE | | | ESTIMATED VALUE SELECTING SYSTEM |
|---|---|---|---|---|---|
| | | A<br>CURRENT LINE TWO-VALUE AVERAGE<br>(THREE VALUES ACQUIRED FOR FIRST HIERARCHICAL LEVEL) | C<br>ONE PIXEL IMMEDIATELY ABOVE | B<br>TWO IMMEDIATELY ABOVE VALUES AVERAGE | |
| FIRST HIERARCHICAL LEVEL | $X_4$ | | $X'_4$ | | C IMMEDIATELY ABOVE |
| | $X_8$ | | $X'_8$ | | C IMMEDIATELY ABOVE |
| SECOND HIERARCHICAL LEVEL | $X_2$ | $(X_0+X_4)/2$ | $X'_2$ | $(X'_0+X'_4)/2$ | MAP |
| | $X_6$ | $(X_4+X_8)/2$ | $X'_6$ | $(X'_4+X'_8)/2$ | MAP |
| THIRD HIERARCHICAL LEVEL | $X_1$ | $(X_0+X_2)/2$ | $X'_1$ | $(X'_0+X'_2)/2$ | MAP |
| | $X_3$ | $(X_2+X_4)/2$ | $X'_3$ | $(X'_2+X'_4)/2$ | MAP |
| | $X_5$ | $(X_4+X_6)/2$ | $X'_5$ | $(X'_4+X'_6)/2$ | MAP |
| | $X_7$ | $(X_6+X_8)/2$ | $X'_7$ | $(X'_6+X'_8)/2$ | MAP |

F I G. 1 2

| REFERENCE INTERMEDIATE VALUE | ESTIMATED VALUE TO BE USED |
|---|---|
| A | C |
| B | A+C−B |
| C | A |

F I G. 1 3

| ESTIMATION ERROR | ESTIMATION ERROR QUANTIZATION VALUE | QUANTIZATION NUMBER |
|---|---|---|
| −21〜 | −28 | 7 |
| −8〜−20 | −12 | 5 |
| −3〜−7 | −4 | 3 |
| −2〜2 | 0 | 1 |
| 3〜7 | 4 | 2 |
| 8〜20 | 12 | 4 |
| 21〜 | 28 | 6 |

F I G. 1 4

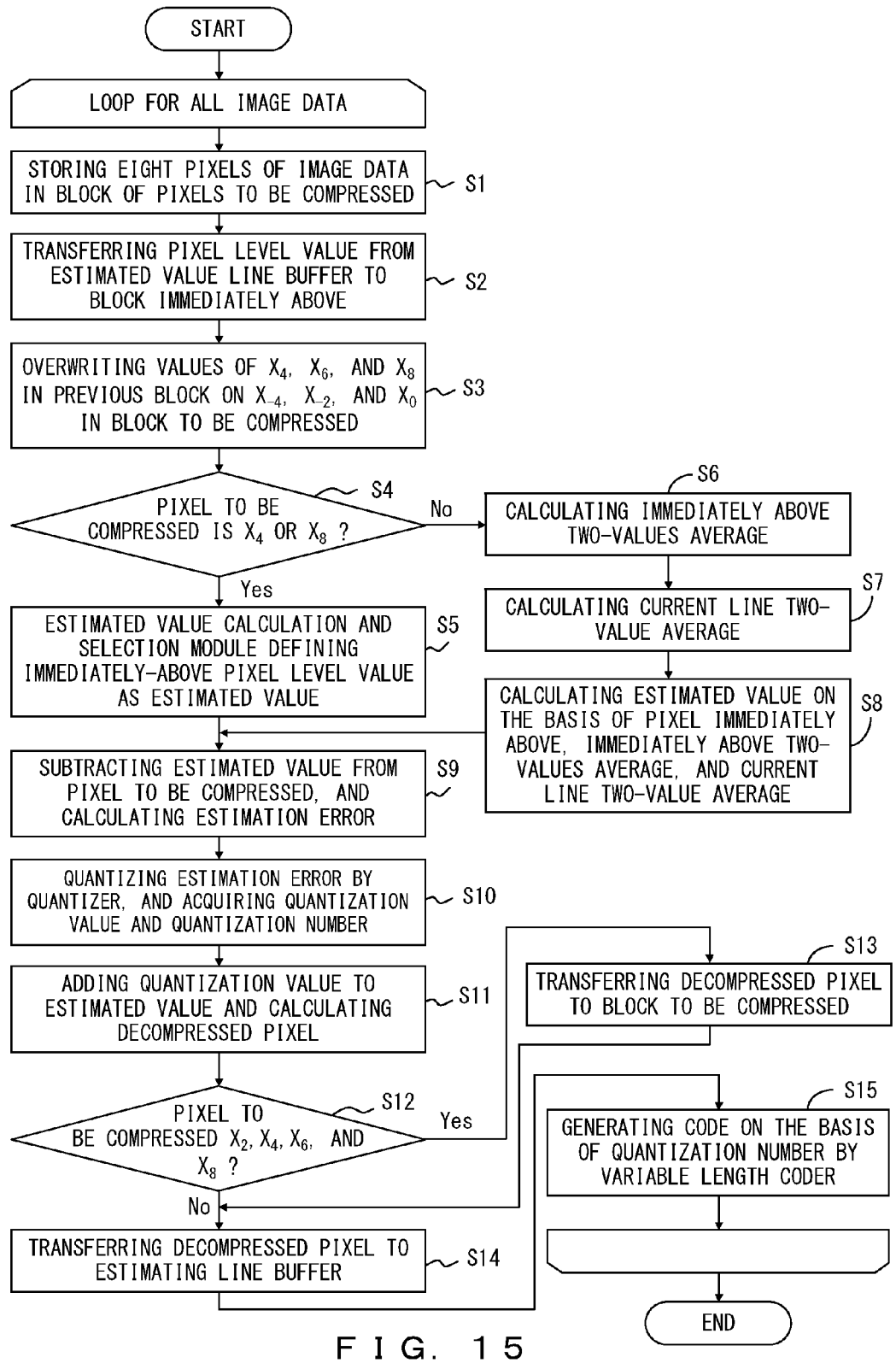
F I G. 1 5

| QUANTIZATION NUMBER | ESTIMATION ERROR QUANTIZATION VALUE |
|---|---|
| 7 | −28 |
| 5 | −12 |
| 3 | −4 |
| 1 | 0 |
| 2 | 4 |
| 4 | 12 |
| 6 | 28 |

F I G. 1 7

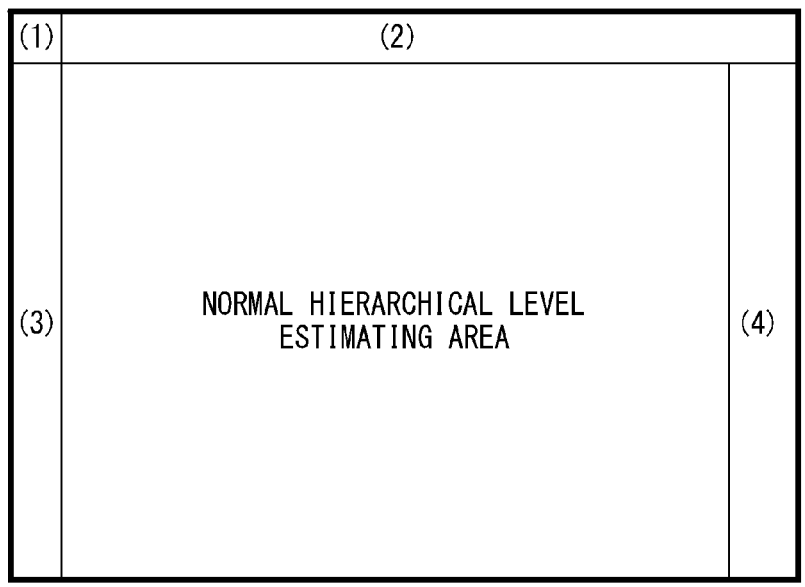
F I G. 19

| PIXEL TO BE ESTIMATED | | (1) ESTIMATED VALUE | (2) ESTIMATED VALUE |
|---|---|---|---|
| FIRST HIERARCHICAL LEVEL | $X_4$ | 0x80 | $X_4$ OF PREVIOUS BLOCK |
| | $X_8$ | 0x80 | $X_8$ OF PREVIOUS BLOCK |
| SECOND HIERARCHICAL LEVEL | $X_2$ | $(0x80+X_4)/2$ | $(X_0+X_4)/2$ |
| | $X_6$ | $(X_4+X_8)/2$ | $(X_4+X_8)/2$ |
| THIRD HIERARCHICAL LEVEL | $X_1$ | $(0x80+X_2)/2$ | $(X_0+X_2)/2$ |
| | $X_3$ | $(X_2+X_4)/2$ | $(X_2+X_4)/2$ |
| | $X_5$ | $(X_4+X_6)/2$ | $(X_4+X_6)/2$ |
| | $X_7$ | $(X_6+X_8)/2$ | $(X_6+X_8)/2$ |

F I G. 2 0

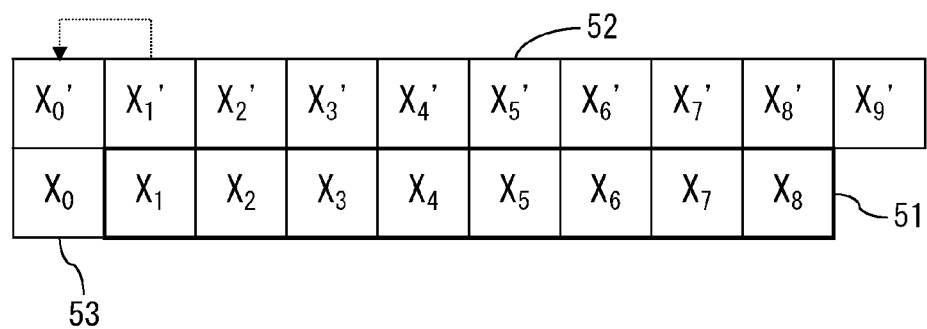
F I G. 2 1

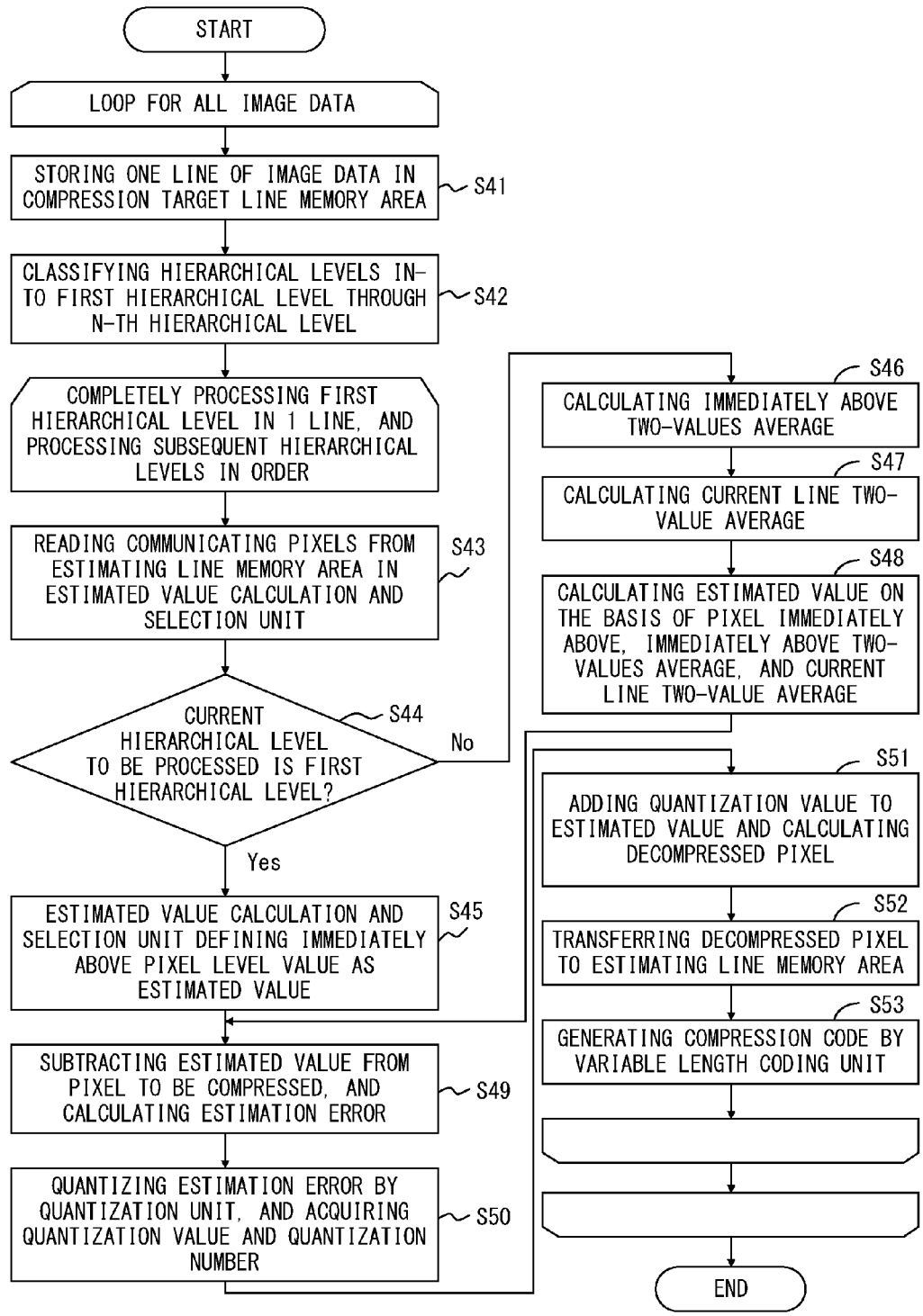
F I G. 2 3

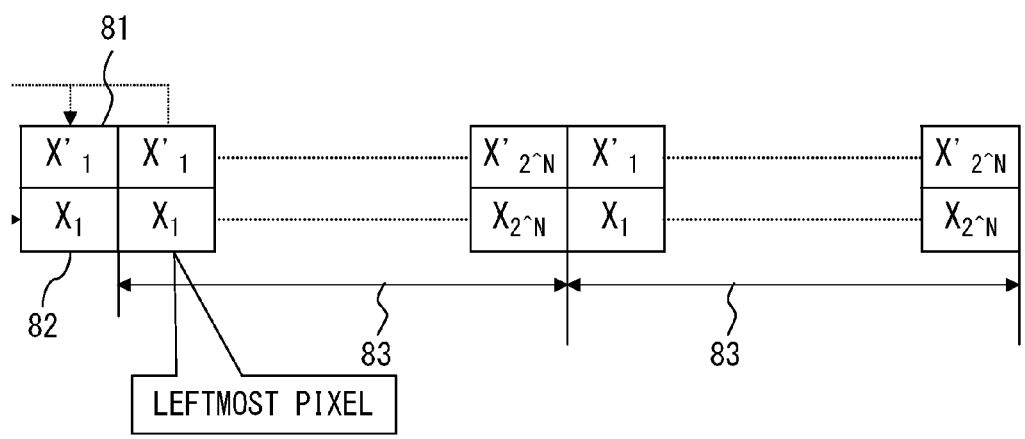
F I G. 2 4 A

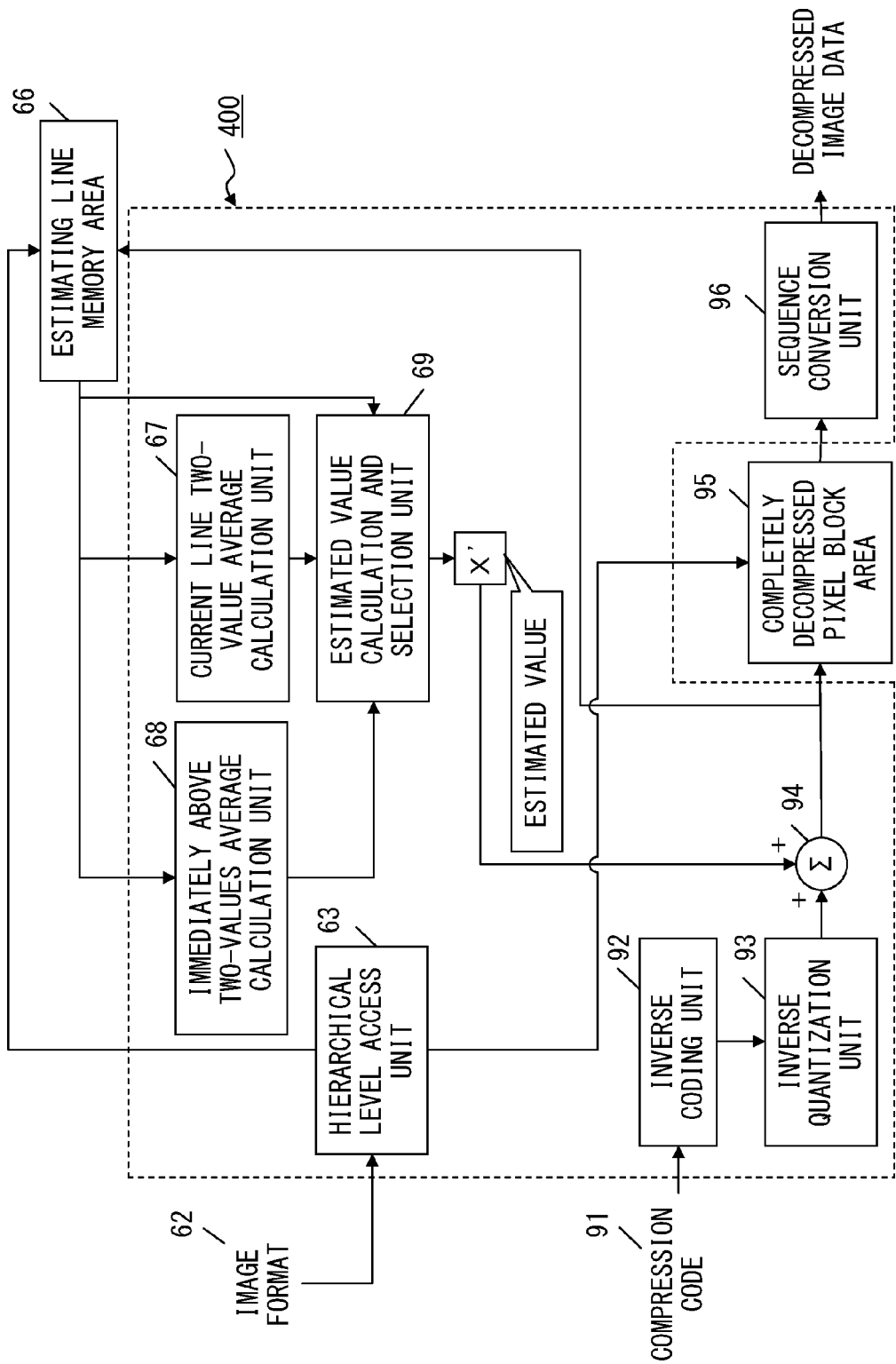
F I G. 25

ND STORAGE
IMAGE DATA COMPRESSION APPARATUS, DECOMPRESSION APPARATUS, COMPRESSING METHOD, DECOMPRESSING METHOD, AND STORAGE MEDIUM

CROSS-REFERENCE TO RELATED APPLICATION

This application is a continuation application of International PCT Application No. PCT/JP2008/000836 which was filed on Mar. 31, 2008.

FIELD

Embodiments described herein relates to the technology of compressing and decompressing image data, and more specifically to the technology of compressing and decompressing image data by a differential pulse code modulation system for estimating a pixel level value for each pixel.

BACKGROUND

The present technology of compressing and decompressing data is used for various equipment units in various fields, and is used in, for example, on-board equipment.

FIG. 1 is an example of loading an on-board image data compressing and decompressing device.

In FIG. 1, a plurality of cameras 2-1 through 2-6 are provided outside a vehicle 1, a plurality of monitors 3 and rear monitors 4-1 and 4-2 are provided in the vehicle 1, and these components are connected on an on-board LAN 5. Image data compressing devices 6-1 through 6-6 are respectively connected to the cameras 2-1 through 2-6, and image data decompressing devices 7-1 through 7-3 are connected to the monitor 3 and the rear monitors 4-1 and 4-2. The image data of the images shot by each of the cameras 2-1 through 2-6 and the image data of the images of a car navigation not illustrated in the attached drawings are compressed by the image data compressing devices 6-1 through 6-6, the compressed data transferred through the on-board LAN 5 is decompressed by the image data decompressing devices 7-1 through 7-3, and then displayed on the monitor 3 and the rear monitors 4-1 and 4-2.

It is necessary to meet the following requirements to compress and decompress moving picture data for vehicles.
(1) High Quality (An Original Image is to be of High Quality as a Natural Image and a CG (Computer Graphics) Image)

As the image information processed in a vehicle, there are natural images represented by common TV images, moving pictures, etc., and CG images (digital images) represented by maps of a car navigation system, etc. Generally, low-frequency components are mainly included in natural images while high-frequency components are mainly included in digital images. In recent on-board terminals and mobile terminals including mobile telephones, both digital images of maps, etc. and natural images of TV, movies, etc. are processed, and an effective data compressing system for both low- and high-frequency components is demanded to efficiently transmit both types of image data.
(2) Low Delay (Not Requiring a Long Time to Compress and Decompress Data for an On-Board Camera)

Image information for on-board use can be images from a peripheral monitor camera. To perform a real-time monitoring operation, a low delay is required to quickly perform a compressing and decompressing process.

(3) Lightweight Device (Small Circuit)

Picture information is transmitted normally by an on-board LAN. However, in a multicast transmission, a compressing and decompressing device is required for each LAN terminal. Therefore, each circuit is to be small.
(4) High-Speed Processing Since 30 through 60 frames of data are transmitted and received in a second for moving pictures, data is to be compressed at a high speed per unit time. In particular, high resolution images have become widespread for high definition pictures, etc., and it is necessary to compress data at a higher speed.

The image compressing technology associated with the above-mentioned subjects is described below.
(1) JPEG, MPEG (Transfer Coding)

In the JPEG and the MPEG, a DCT (discrete cosine transfer) is performed on an original image, and an obtained DCT coefficient is quantized.

A DCT is a method of frequency-converting image data. Since human eyes are sensitive to low-frequency components (flat portions in an image), a natural image can be compressed at a high compression ratio to suppress picture degradation by finely quantizing a DCT coefficient of a low frequency while roughly quantizing a DCT coefficient of a high frequency.

However, since lines, letters, etc. of CG map images of pictures are considerably degraded in their high frequency components in this method, the method is not appropriate for compressing CG images.

FIG. 2 illustrates a coding method by the DCT used in the JPEG etc. as a prior art.

In the DCT, original image data is first frequency-converted so as to divide the data into high-frequency components and low-frequency components. Then, the low-frequency components are finely quantized and the high frequency components are roughly quantized. Thus, the image data can be compressed at a high compression ratio. However, the picture degradation of the high-frequency components of lines, letters, etc. remains in this compressing method.

As for the compression ratio and the circuit size, the two-dimensional correlation can be acquired by performing a converting and coding process on a block of 8×8 pixels in the JPEG, thereby realizing a high compression ratio (about 1/10). However, in this case, memory of at least 8 lines is required and the circuit becomes large. Furthermore, in the MPEG, a considerably high compression ratio (1/20 or more) can be expected because the correlation is acquired between frames, but the memory for holding data of 1 frame is required and the circuit becomes larger.
(2) JPEG-LS (Lossless)

A JPEG-LS is a compressing system capable of performing lossless compression on still image data. In this system, a reasonable level value is estimated by considering the edge in the vertical and horizontal directions on the basis of a MED (median edge detector, that is, a type of MAP and DPCM), and an estimation error is directly coded.

FIG. 3 illustrates a compressing system by the JPEG-LS as a prior art.

In the JPEG-LS, an estimating unit estimates a pixel X from pixels A, B, and C illustrated in FIG. 3. Then, an error (X-X') between an estimated value X' and a measured value X is obtained and coded, thereby performing data compressing.

Described below is the subject of the compressing technique by the JPEG-LS.

Subject (1): Difficult to Adjust Image Quality

Since the JPEG-LS is lossless compression, it is difficult to gradually degrade image quality during the lossy compression.

Since the propagation of a quantization error occurs in the direction of the line, and a next pixel is estimated on the basis of the pixel including the quantization error, the estimation accuracy becomes worse when the quantizing step is more coarse.

For example, in FIG. 4, when the data of the pixel A includes an error, the error propagates through the pixel $X_1$ and the pixel $X_2$. Therefore, the coarser the quantizing step, the worse the estimation accuracy becomes.

Subject (2): Very Difficult to Compress and Decompress Moving Pictures in Real Time In lossy compression, estimation, quantization, and calculation of a decompressed pixel level value are executed for each pixel in the direction of the line. However, in compression by the JPEG-LS, the decompressed pixel level value of the immediately previous pixel is necessary to estimate the next pixel. Therefore, it is hard to perform high-speed processing.

For example, when a pixel is processed in the order illustrated in FIG. 5A, it is necessary to compress one pixel in the period (1 clock) in which one pixel is transmitted. However, if the processing time is 1 clock in each of the processes of estimating, quantizing, and calculating a decompressed pixel level value, 3 clocks are required to compress one pixel. Then, since the next pixel is estimated using the immediately previous pixel, the next pixel cannot be estimated until the immediately previous pixel is completely decompressed. Therefore, the compressing and decompressing processes are performed according to the timing as illustrated in FIG. 5B, and cannot be performed in real time.

(3) Hierarchical Coding or Sequential Regeneration Coding System (Patent Document 1, Patent Document 2)

To perform an estimation and coding system with high quality and at a high compression ratio (image quality adjustment), a hierarchical estimation method is frequently used. An example of hierarchical estimation in a prior art is described below with reference to FIG. 6.

1) A bit plane (a white and black image of 0 and 1 with the depth of each bit, that is, 8 planes for 8 bits) is generated. In FIG. 6, only the total of three planes, that is, the plane obtained in the extrapolating process at the top for simplicity, and two planes obtained in the subsequent interpolating process, are illustrated.

2) The pixels in each plane are hierarchically binary-coded. In and after the second hierarchical levels, the coding order and means are changed on the basis of the states of the coded peripheral pixels.

3) Depending on the situation, no pixels may be coded or decoded, but a simple average of four already decoded peripheral pixels is defined as a pixel level value of a non-decoded pixel.

When the hierarchical estimation is applied as is, the complicated procedure incurs a large circuit, and unreasonable cost-performance for LSI implementation. In addition, it requires a large buffer memory corresponding to a block line (for 5 lines in the case illustrated in FIG. 6), and generates a large circuit.

Patent Document 1: Japanese Laid-open Patent Publication No. 60-127875
Patent Document 2: Japanese Laid-open Patent Publication No. 10-84548

SUMMARY

According to an embodiment of the invention, an image compression apparatus, a decompression apparatus, a compressing method, a decompressing method, and a program for having high speed, low delay, high image quality, and a small circuit are provided.

The image compression apparatus includes a line memory unit, a division unit, a first estimation value calculation unit, a second estimation value calculation unit, and an estimation coding unit.

The line memory unit holds pixel values for at least one immediately previous line in the lines to be processed of an image to be compressed.

The division unit divides the pixels of the line to be processed into $2^n$-pixel blocks.

The first estimation value calculation unit extrapolation-estimates the $2^{n-1}$-th pixel and the $2^n$-th pixel in the blocks divided by the division unit using as reference values the values of the pixels immediately above the $2^{n-1}$-th pixel and the $2^n$-th pixel, respectively, and obtains an estimated value in the processing for the first hierarchical level.

The second estimation value calculation unit interpolation-estimates certain pixels using as reference values the pixel values of the one immediately previous line in the line memory and the estimated values obtained up to the processing for the immediately previous hierarchical level, and obtains an estimated value in the processing for the second hierarchical level through the processing for the n-th hierarchical level.

The estimation coding unit obtains an estimation error from the estimated value obtained in the processes from the processing for the first hierarchical level to the processing for the n-th hierarchical level, converts the estimation error into a quantization number, converts the quantization number into a variable length code, and obtains a compression code.

With the above-mentioned configuration, the memory only has to include a line memory unit, thereby maintaining a small circuit.

In addition, since the hierarchical processes may be concurrently performed, the compressing process may be performed at a high speed.

The image decompression apparatus includes a line memory unit, a first estimation value calculation unit, a second estimation value calculation unit, and a decompressed pixel value calculation unit.

The line memory unit holds pixel values for at least one immediately previous line in the lines to be processed of an image to be decompressed.

The division unit divides the pixels of the line to be processed into $2^n$-pixel blocks.

The first estimation value calculation unit extrapolation-estimates the $2^{n-1}$-th pixel and the $2^n$-th pixel in the blocks divided by the division unit using as reference values the values of the pixels immediately above the $2^{n-1}$-th pixel and the $2^n$-th pixel, respectively, and obtains an estimated value in the processing for the first hierarchical level.

The second estimation value calculation unit interpolation-estimates certain pixels using as reference values the pixel values of the one immediately previous line in the line memory and the estimated values obtained up to the processing for the immediately previous hierarchical level, and obtains an estimated value in the processing for the second hierarchical level through the processing for the n-th hierarchical level.

The decompressed pixel value calculation unit obtains a quantization number from a compression code, obtains an estimation error quantization value from the quantization number, and obtains a pixel value of a decompressed pixel using the estimation error quantization value and the estimated value obtained by the first estimation value calculation unit or the estimated value obtained by the second estimation value calculation unit.

With the above-mentioned configuration, the memory only has to include a line memory unit, thereby maintaining a small circuit.

In addition, since the hierarchical processes may be concurrently performed, the decompressing process may be performed at a high speed.

Furthermore, the data compressing method, the data decompressing method, and the related programs are included in the scope of the present invention The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 5A illustrates the order of processing each pixel;

FIG. 8 illustrates the process according to an embodiment of the present invention when n is set to 3 (n=3);

FIG. 11 is an example of a configuration of the image data compression apparatus according to an embodiment of the present invention;

FIG. 12 illustrates the reference value of each pixel;

FIG. 13 illustrates a reference intermediate value and a corresponding estimated value;

FIG. 14 illustrates the correspondence among the estimation error, the estimation error quantization value, and the quantization number;

FIG. 15 is a flowchart of the operating process of the image data compression apparatus according to an embodiment of the present invention when image data is compressed;

FIG. 17 illustrates the correspondence between the quantization number and the estimation error quantization value;

FIG. 19 illustrates the position of the image data in one frame when exception handling is performed in the image data compressing process and decompressing process in an embodiment of the present invention;

FIG. 20 illustrates an estimated value of the position of (3) on the leftmost side in the exceptional handling illustrated in FIG. 19;

FIG. 21 is an example of a substitute pixel when an estimated value of the pixel in position (3) on the leftmost side in FIG. 19 is obtained;

FIG. 23 is a flowchart of the operating process of a data compression program 300 when image data is compressed;

FIG. 24A illustrates an estimated value calculated in the position of (2) illustrated in FIG. 19;

FIG. 25 is an example of a program configuration of a data decompression program in an embodiment of the present invention;

DESCRIPTION OF EMBODIMENTS

An embodiment of the present invention is described below in detail with reference to the attached drawings.

The image compression apparatus and the image decompression apparatus of the present embodiment include memory for storing about one line of an image and perform MAP (median adaptive predictor) estimation alternately among hierarchical levels in one block, thereby solving the bottleneck in the processing speed in an estimating process for processing with a high image quality and low delay at a high speed as lightweight apparatuses.

In addition, to attain a high image quality by improving the estimation accuracy, the MAP estimation is performed by considering the interpolation-estimate on a high resolution component pixel. The estimating system may be an extrapolation-estimate for estimating data outside a data sequence, and an interpolation-estimate for estimating in a data sequence. The estimation accuracy of the interpolation-estimate is higher because the tendency of the data sequence may be more easily acquired.

Figure 7:
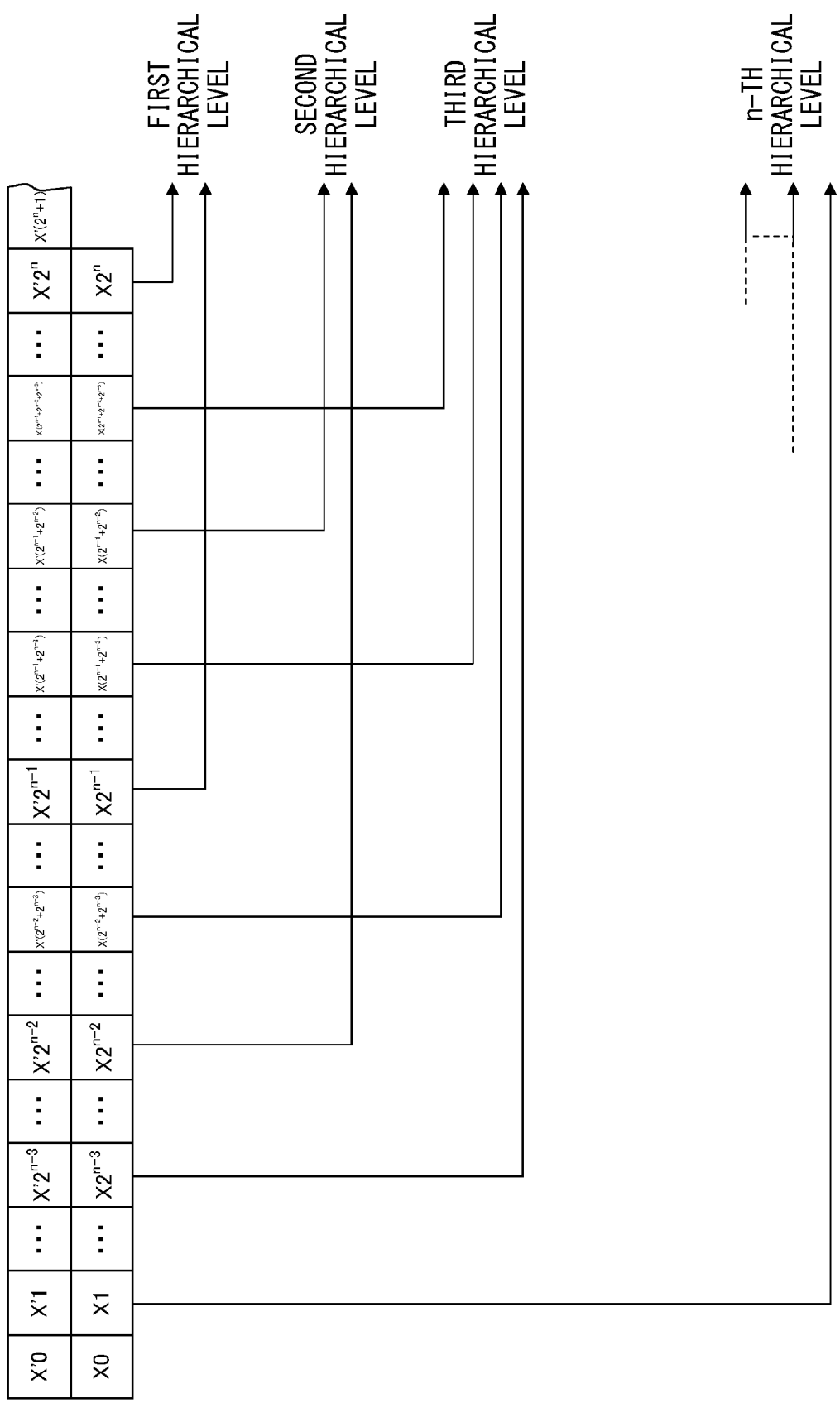
FIG. 7 illustrates the outline of the estimating method according to an embodiment of the present invention.

FIG. 7 illustrates the outline of the estimating method according to an embodiment of the present invention.

In the image compression apparatus and the image decompression apparatus according to the present embodiment, image data is processed in $2^n$ units ($2^n$ pixels are hereinafter processed as one block).

In FIG. 7, the pixels X 1 through X $2^n$ are pixels to be processed, and X' 1 through X' $2^n$ form an immediately previous line of X 1 through X $2^n$, that is, the pixels of an immediately previous line.

In the present embodiment, as the processing for the first hierarchical level, the intermediate pixel X $2^{n-1}$ and the last X $2^n$ in the pixels X 1 through X $2^n$ are obtained by the extrapolation-estimate using the adjacent pixels X' $2^{n-1}$ and X' $2^n$, that is, the pixels immediately above.

Then, as the processing for the second hierarchical level, the intermediate pixel of the pixels X $2^n$ is obtained by the MAP estimation in the pixel order of X $2^{n-2}$ and X $2^{n-1}$+X $2^{n-2}$ using the pixel X 0 to the left of the pixel X 1 (that is, X $2^n$ in the immediately previous block obtained in the process performed on the immediately previous block), the pixel X $2^{n-1}$ obtained in the processing for the first hierarchical level, and a decompressed pixel value in the immediately previous line.

In the processing for the third hierarchical level, the intermediate pixel of the pixels X $2^n$ by the MAP estimation in the order of the pixels $2^{n-3}$, X $2^{n-2}+$X $2^{n-3}$, X $2^{n-1}+$X $2_{n-3}$, and X $2^{n-1}+$X $2^{n-2}+$X $2^{n-3}$ using the pixel X 0 and the pixels X $2^{n-2}$, X $2^{n-1}$, X $2^{n-1}+$X $2^{n-2}$ obtained up to the processing for the second hierarchical level.

Similarly, in the subsequent processing, the intermediate pixels of the obtained pixels are obtained by the MAP estimation and, in the last processing for the n-th hierarchical level, the intermediate pixel is obtained by the MAP estimation in the pixel order X 1, X 3, . . . , and X $2^{n-1}$.

In the above-mentioned processing, the process for the next hierarchical level may be started before completing the current hierarchical process, thereby concurrently performing the processing for two hierarchical levels and performing the entire processing at a high speed.

Since the data of the pixels required in the processing is only the data of the pixels in the immediately previous line to the pixel to be processed and the data of the pixels in the block to be processed, it is necessary to provide the memory for about one line of an image for holding the pixel data, thereby maintaining small circuits for the image compression apparatus and the image decompression apparatus.

An outline of the present application is described below more practically by setting n to 3 (n=3).

FIG. 8 illustrates the process according to the present embodiment where n is 3 (n=3).

Since n is 3 (n=3), the process in divided into three hierarchical levels, and an estimating and coding process is performed in the order of the first, second, and third hierarchical levels.

In FIG. 8, the pixels X 4 and X 8 are estimated and obtained by the extrapolating process first in the processing for the first hierarchical level on the pixel data of the process line 2 using the pixel data of the immediately previous line 1. Next, in the processing for the second hierarchical level, the pixels X 2 and X 6 are obtained by estimating them in the interpolating process using the pixel data of the immediately previous line 1 and the pixel data obtained in the processing for the first hierarchical level. Finally, in the processing for the third hierarchical level, the pixels X 1, X 3, X 5, and X 7 are estimated and obtained by the interpolating process using the pixel data of the immediately previous line and the pixel data obtained in the processing for the first and second hierarchical levels.

When the estimation coding process is completed on all pixels X 1 through X 8 of the target pixel block 3, the estimation coding process is performed similarly on the three hierarchical levels of the next block.

Figure 9:
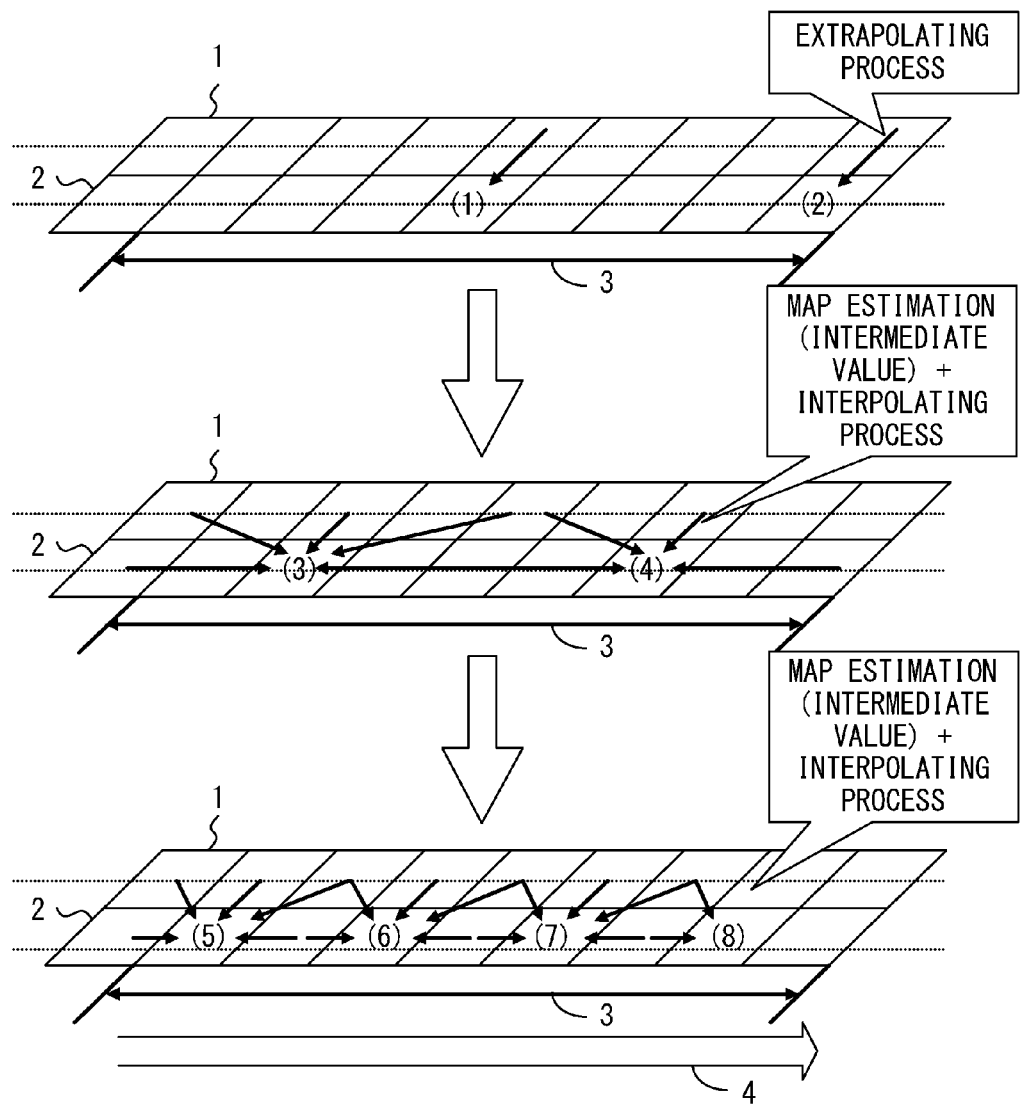
FIG. 9 illustrates a practical process on each hierarchical level illustrated in FIG. 8.

FIG. 9 practically illustrates the process for each hierarchical level illustrated in FIG. 8.

The estimation coding process is practically performed on the basis of the pixel data of the immediately previous line 1 in the lines to be processed and stored in the line memory and the pixel data estimated and obtained for the processed previous hierarchical level.

The line memory stores the decompressed pixel of each pixel level value for the immediately previous line 1.

In FIG. 9, the order of processing the eight pixels in the target pixel block 3 is (1), (2), . . . , and (8).

First, as the processing for the first hierarchical level, (1) corresponding to X 4 in FIG. 8 is estimated and obtained by the extrapolating process from X' 4 in the immediately previous line 1 in the line memory. Next, (2) corresponding to X 8 in FIG. 8 is estimated and obtained by the extrapolating process from X' 8 in the immediately previous line 1 in the line memory.

Next, in the processing for the second hierarchical level, (3) corresponding to X 2 in FIG. 8 is obtained by the MAP estimation from the pixels X' 0, X' 2, and X' 4 in the immediately previous line 1 in the line memory, and the pixels X 0 and X 4 obtained in the processes up to the processing for the first hierarchical level of the process line 1. Next, (4) corresponding to X 6 in FIG. 8 is obtained by the MAP estimation from the pixels X' 4, X' 6, and X' 8 in the immediately previous line 1 in the line memory, and the pixels X 4 and X 8 obtained in the processes up to the processing for the first hierarchical level of the process line 1.

Finally, as the processing for the third hierarchical level, (5) corresponding to X 1 in FIG. 8 is obtained by the MAP estimation from the pixels X' 0, X' 1, and X' 2 in the immediately previous line 1 in the line memory, and the pixels X 0 and X 2 obtained in the processes up to the processing for the second hierarchical level of the process line 1. Next, (6) corresponding to X 3 in FIG. 8 is obtained by the MAP estimation from the pixels X' 2, X' 3, and X' 4 in the immediately previous line 1 in the line memory, and the pixels X 2 and X 4 obtained in the processes up to the processing for the first hierarchical level of the process line 1. Similarly, in the subsequent processing, (7) corresponding to X 5 in FIG. 8 is obtained by the MAP estimation from the pixels X' 4, X' 5, and X' 6 in the immediately previous line 1 in the line memory, and the pixels X 4 and X 6 obtained in the processes up to the processing for the second hierarchical level of the process line 1. Next, (8) corresponding to X 7 in FIG. 8 is obtained by the MAP estimation from the pixels X' 6, X' 7, and X' 8 in the immediately previous line 1 in the line memory, and the pixels X 6 and X 8 obtained in the processes up to the processing for the second hierarchical level of the process line 1.

The above-mentioned processes are performed without waiting for the estimation results by alternately performing the processing on the hierarchical levels in a block in the line direction 4.

Normally, the MAP performs an estimating process of high performance by defining as an estimated value one of the three candidates for an estimated value with the correlations in the vertical and horizontal directions taken into account. Also in the present embodiment, three candidates for an estimated value may be calculated with the correlations in the vertical and horizontal directions taken into account by referring to the decompressed pixels of the previous hierarchical level in and after the processing for the second hierarchical level. Therefore, the estimation accuracy may be furthermore improved, and the compression may be realized with high image quality.

Figure 10:
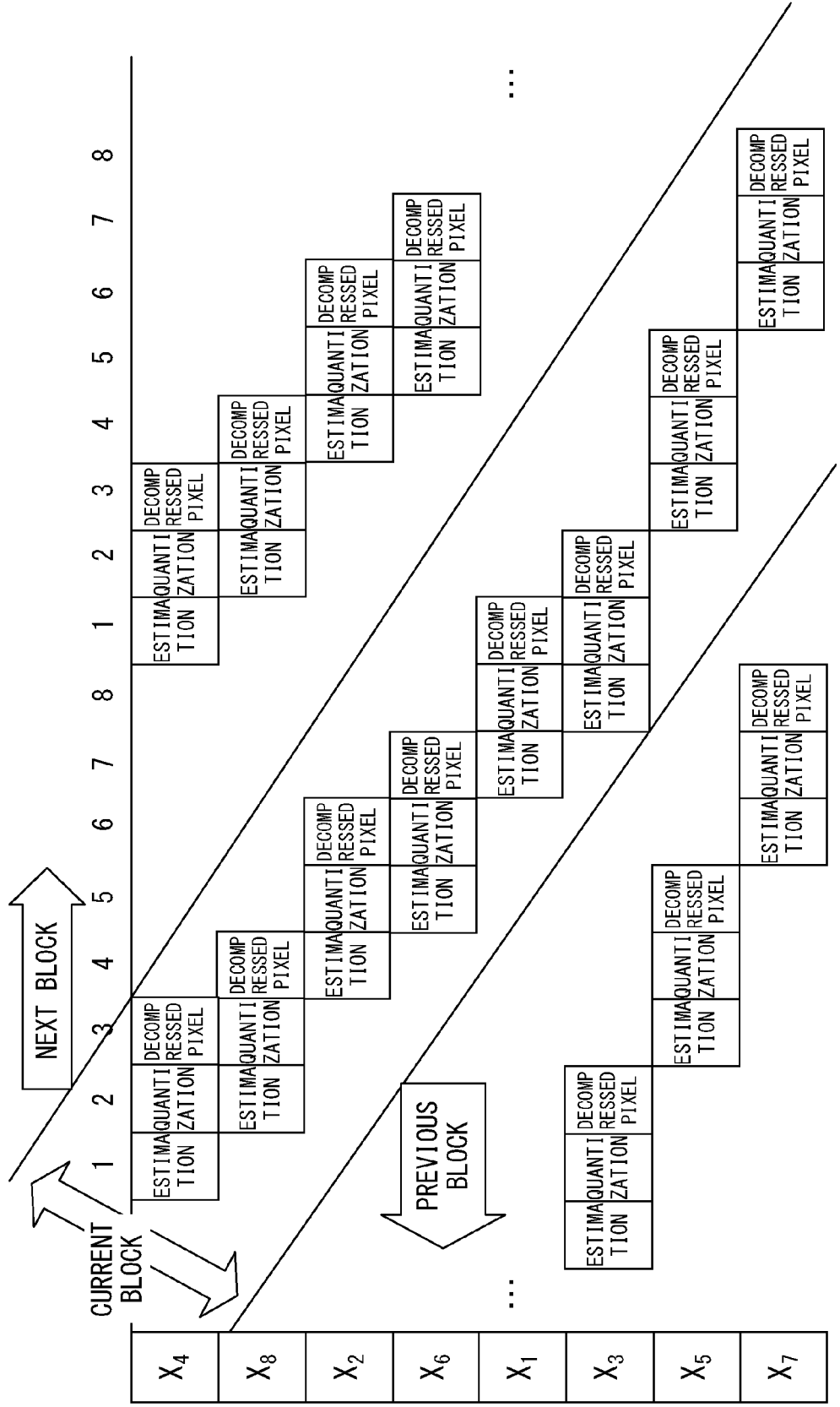
FIG. 10 illustrates the outline of the timing chart of the pixel decompressing process when one block includes eight pixels (n=3)

FIG. 10 illustrates the outline of the timing chart of the pixel decompressing process when one block includes eight pixels (n=3).

In FIG. 10, for the pixels X 4 and X 8, only using the pixel data value of one immediately previous line enables the next block to be started before completing the process of all pixels in the previous block. In FIG. 10, when the pixels up to the pixel X 6 of the previous block are decompressed, the estimating process of the pixel X 4 of the next block is started.

In addition, since the pixel data values of the pixels X 2, X 6, X 1, X 3, X 5, and X 7 are not used in the estimating process of the next block, the process may be performed with delay. Therefore, the MAP performed with the interpolating process capable of realizing high performance estimation may take sufficient processing time.

In the real-time transmission of moving pictures, a pixel is transmitted in one clock. Therefore, it is necessary in the estimation coding system for processing each pixel to process one pixel in one clock. Accordingly, if one clock each is required to perform the estimation, the quantization, and the calculation on a decompressed pixel level value, the pixels X 4 and X 8 are processed within 8 clocks as illustrated in FIG. 10, and the other pixels are processed later, thereby sequentially processing the blocks continuously.

In FIG. 10, one circuit each is necessary for the estimation, the quantization, and the calculation of a decompressed pixel level value by performing each process with a different timing in the same clock. However, it is also possible to provide a plurality of circuits for each process to concurrently perform the processes, thereby further reducing the processing period for each block.

Described below is the configuration of the image data compression apparatus according to the present embodiment.

FIG. 11 is an example of a configuration of an image data compression apparatus 100 according to an embodiment of the present invention.

The image data compression apparatus 100 in FIG. 11 has a configuration for processing image data 11 input continuously as described above for every eight pixels (n=3).

In FIG. 11, the image data 11 input to the image data compression apparatus 100 is a group of pixels to be compressed, and the pixel data is input in the line direction. A sequence control circuit 12a controls the order of the processes on the eight pixels of a block to be compressed, and controls the pixel data output from the multiplexer in the image data compression apparatus 100 using a control signal.

The pixel processing timing of the image data compression apparatus 100 and an image data decompression apparatus 200 described later according to the present embodiment is described below with reference to FIG. 10.

The order of the processes on the pixels in one block is illustrated in FIG. 10. That is, the pixel X 4 is completely processed at the third clock, the pixel X 8 is completely processed at the fourth clock, the pixel X 5 is completely processed at the fifth clock, the pixel X 2 is completely processed at the sixth clock, the pixel X 6 is completely processed at the seventh clock, the pixel X 7 is completely processed at the eighth clock, the pixel X 1 is completely processed at the ninth clock, and the pixel X 3 is completely processed at the tenth clock. For appropriate timing, the processes on the pixels X 5 and X 7 are those performed on the pixels of the previous block.

A multiplexer (MUX 1) 13 sequentially allocates the pixels of the image data 11 input pixel by pixel to the image data compression apparatus 100 for processing in blocks. A pixel block 14 to be compressed holds pixel data (level value) of the pixel to be compressed in the current step. For the pixels X 5 and X 7, the pixel data of one immediately previous block is held from the viewpoint of delay in processing. A demultiplexer (DMUX 1) 15 passes the pixel level value in the pixel block 14 to be compressed to the processing in the subsequent stages in the order of hierarchical levels. An estimating line buffer 16 holds the decompressed pixel level value for at least one immediately previous line of the block to be processed, and passes the value to an immediately above block line memory 17 immediately above the pixel block 14 to be compressed. The immediately above block line memory 17 stores a pixel level value of the line immediately above the pixel in the pixel block 14 to be compressed. The pixels X' −4, X' −3, X' −2, X' −1, and X' 0 in the immediately above block line memory 17 indicate the pixels of the pixels X' 4, X' 5, X' 6, X' 7, and X' 8 of the previous block. A pixel block 18 to be compressed holds a decompressed pixel level value already processed in the pixels of a pixel block 004 to be compressed. The pixel level value in the pixel block 18 to be compressed is used in calculating an estimated value. The pixels X −4, X −2, and X 0 in the pixel block 18 to be compressed indicate the previous block pixels X 4, X 6, and X 8 for use in processing the previous block pixels X 5 and X 7.

A demultiplexer (DMUX 2) 19 outputs the level value of the pixel immediately above the pixel to be compressed to an estimated value calculation and selection module 26. The pixel immediately above corresponding to the pixel to be estimated output by the demultiplexer 19 is illustrated in C of FIG. 12.

A demultiplexer 20 outputs the pixel level value for use in calculating the two immediately above values' average of the pixel to be compressed to a two immediately above values' average calculation module 24. The two immediately above values' average corresponding to the pixel to be estimated is indicated by B in FIG. 12, and the demultiplexer 20 outputs a larger pixel level value between two pixels used in calculating the average value. When the pixels to be estimated are the pixels X 4 and X 8 processed in the processing for the first hierarchical level, the demultiplexer 20 does not operate.

Figure 1:
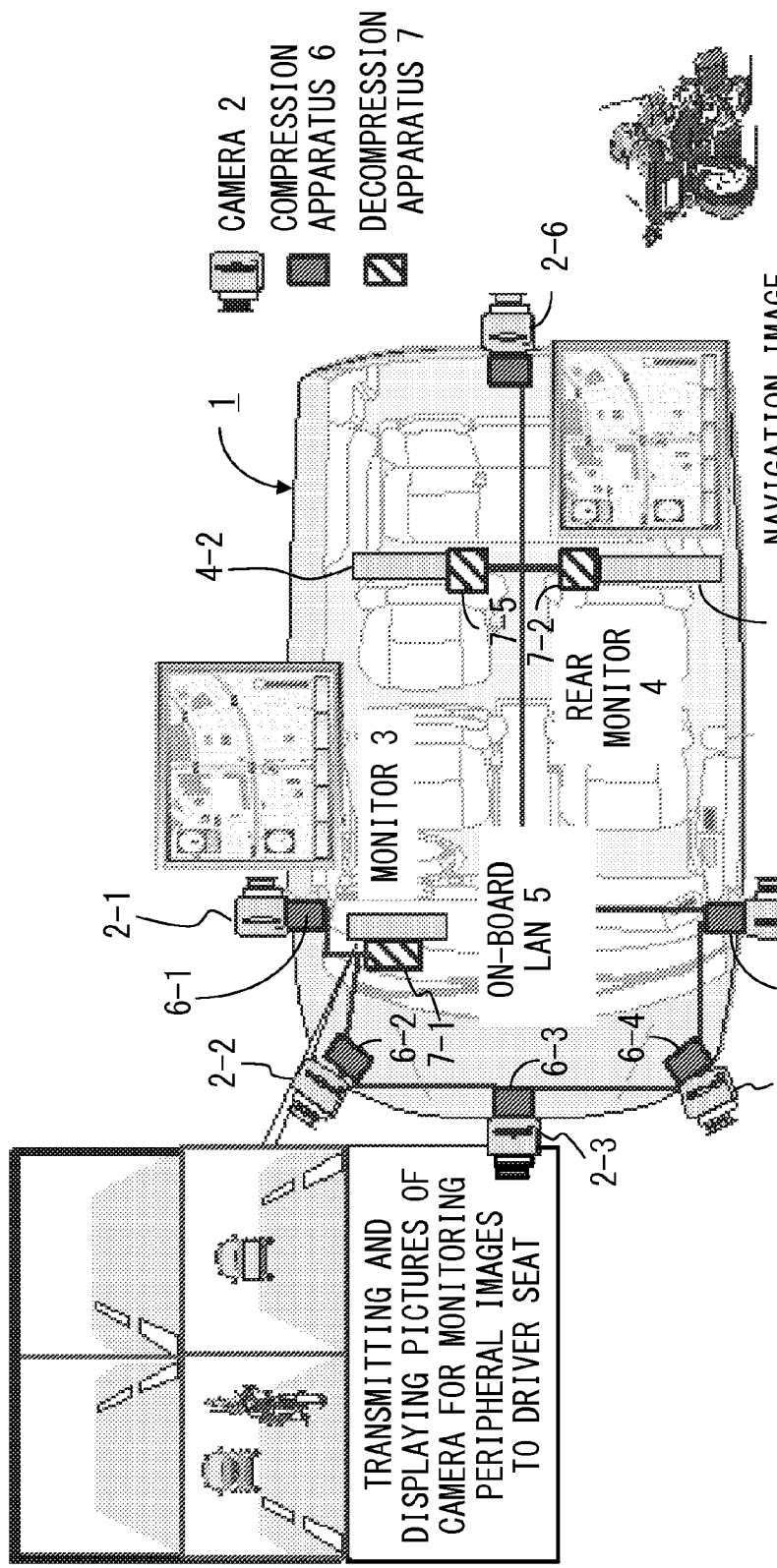
FIG. 1 identifies an example of loading an on-board image data compression and decompression apparatus.
Figure 2:
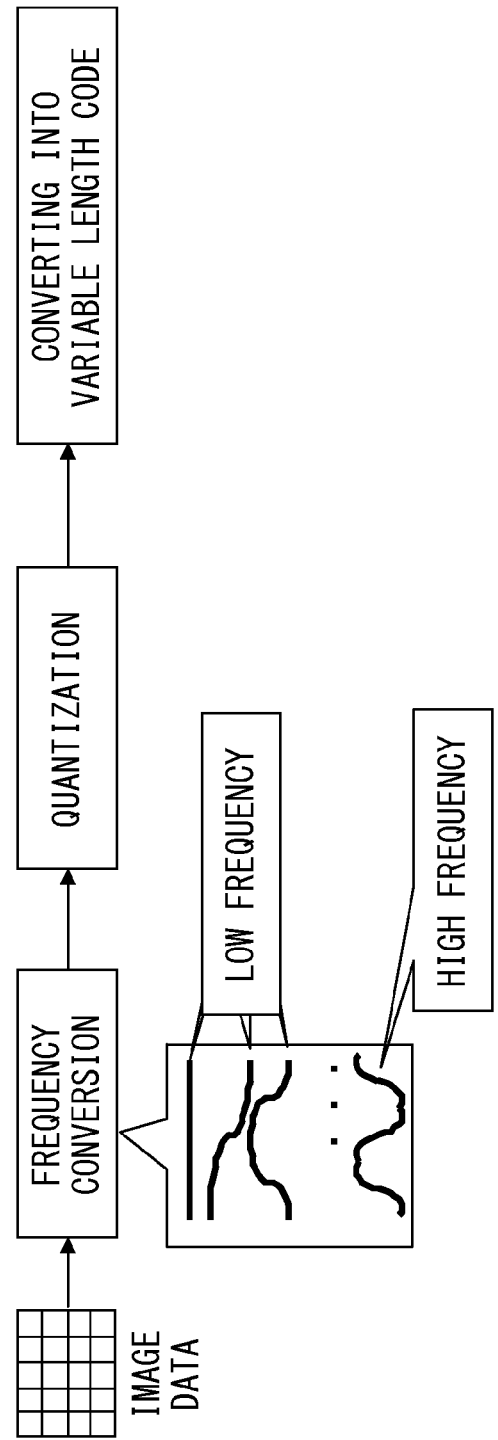
FIG. 2 illustrates a coding method by the DCT as a prior art.
Figure 3:
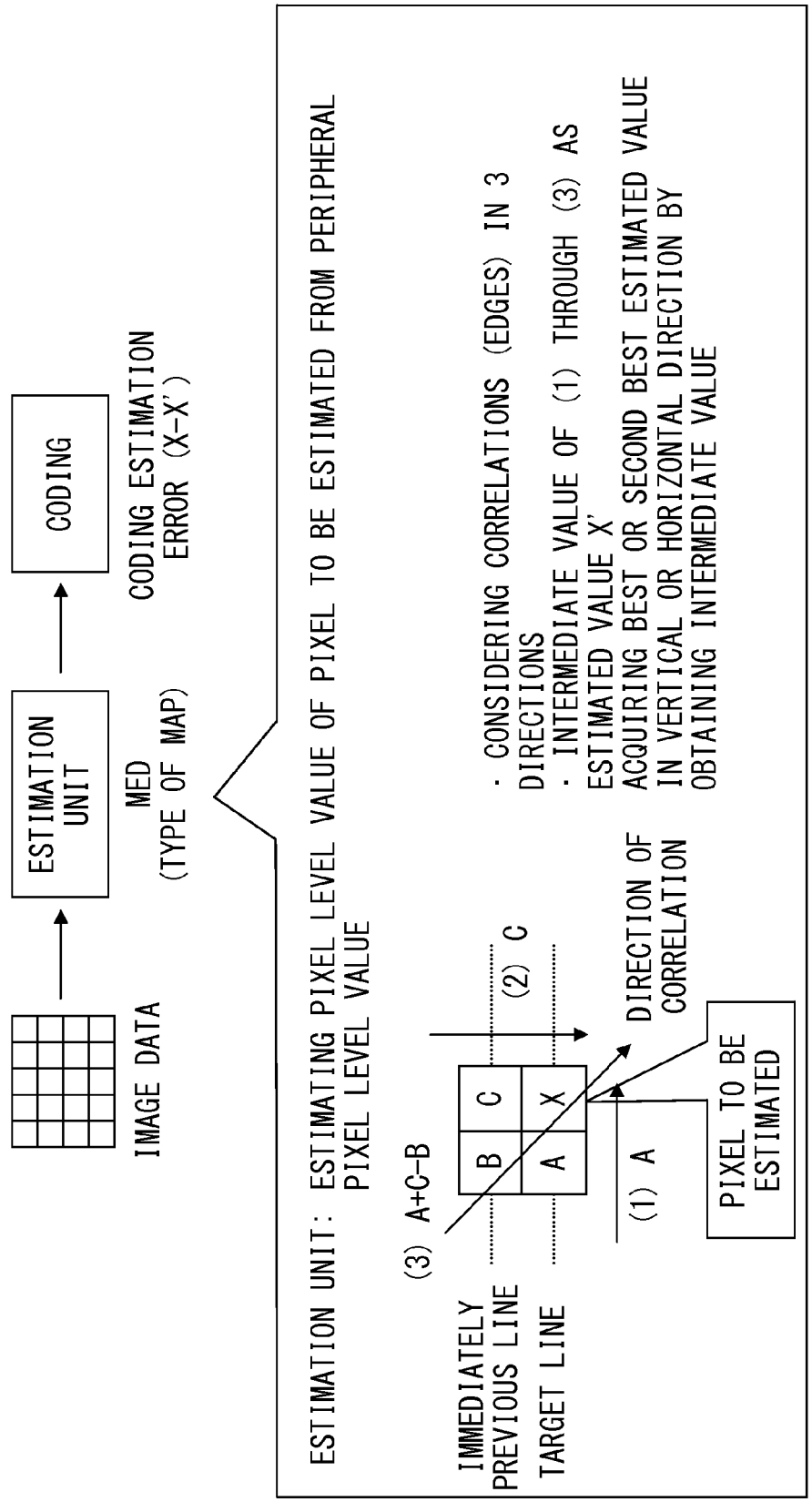
FIG. 3 illustrates a compressing system by the JPEG-LS as a prior art.
Figure 4:
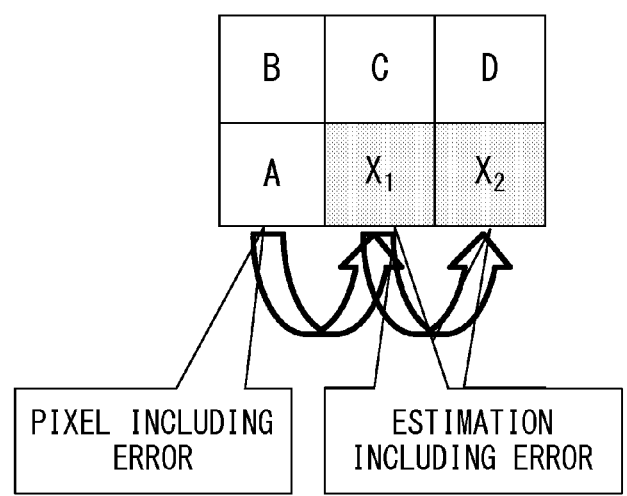
FIG. 4 is an explanatory view of the compressing technique by the JPEG-LS as a prior art.
Figure 5B:
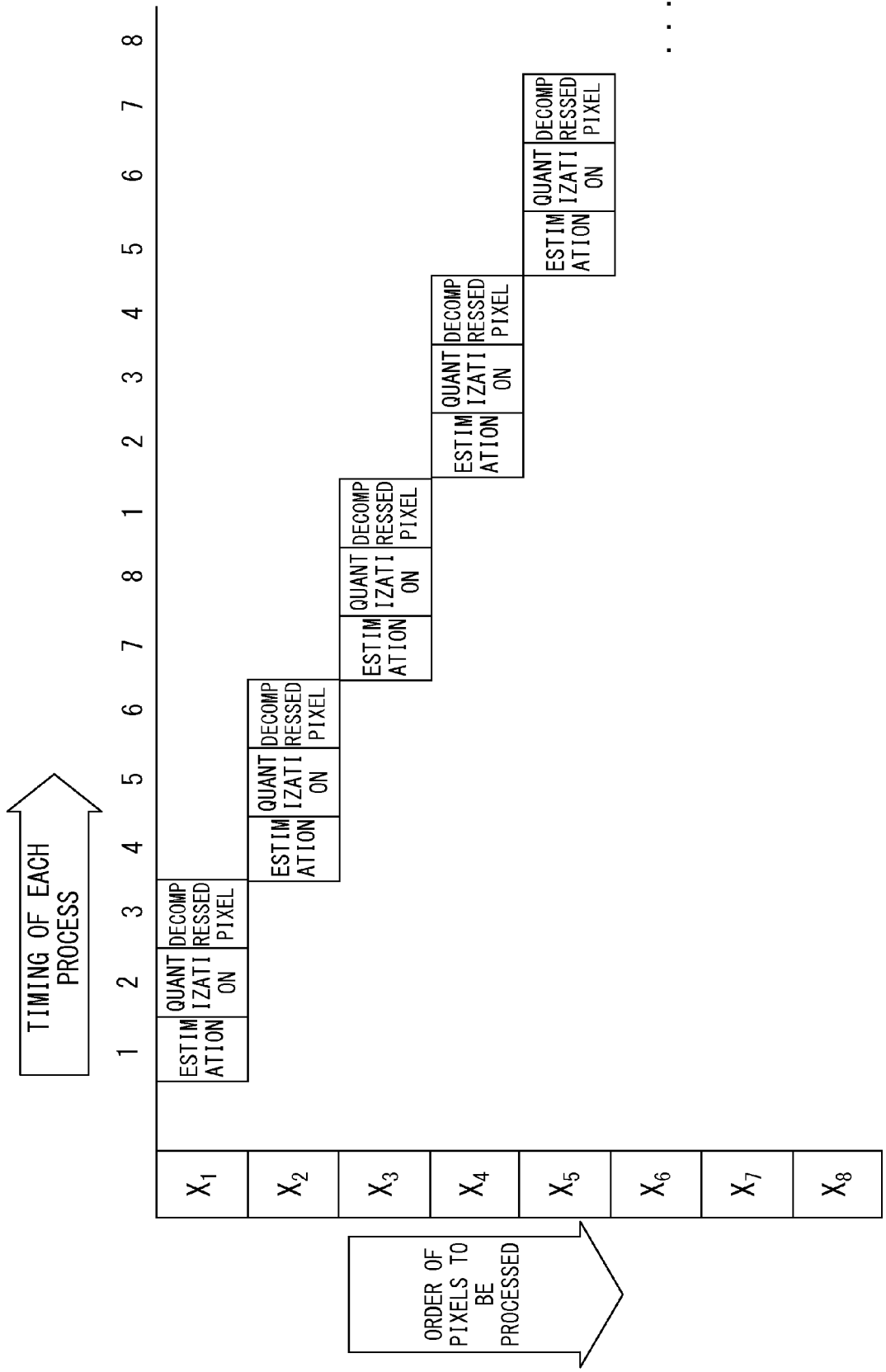
FIG. 5B illustrates the timing of compressing and decompressing processes by the JPEG-LS as a prior art.
Figure 6:
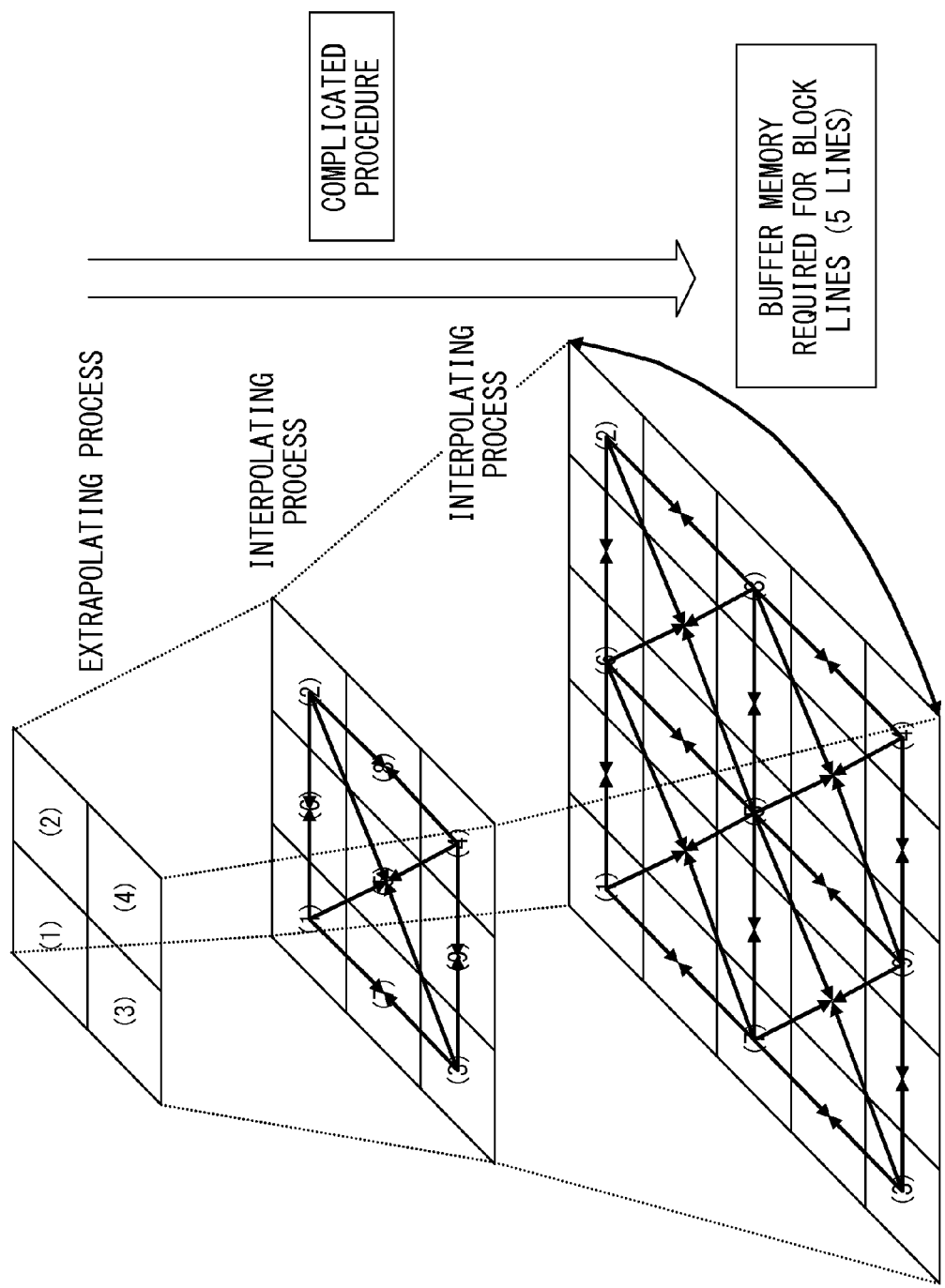
FIG. 6 is an example of hierarchical estimation by a prior art.

A demultiplexer (DMUX 4) 21 outputs a pixel level value used in calculating a two immediately above values' average of a pixel to be compressed to the two immediately above values' average calculation module 24. The two immediately above values' average corresponding to the pixel to be estimated is illustrated by B in FIG. 2, and the demultiplexer 21 outputs a pixel level value having a larger value in the two pixels used in calculating an average value. The demultiplexer (DMUX 4) 21 does not operate when the pixel to be estimated is the pixel X 4 or X 8 processed in the processing for the first hierarchical level.

The demultiplexer (DMUX 5) 22 outputs the pixel level value of the pixel for use in calculating the current line two-value average of the pixel to be compressed to a current line two-value average calculation module 25. The current line two-value average corresponding to the pixel to be estimated is indicated by A in FIG. 12, and the demultiplexer 22 outputs a pixel having a smaller value between the two pixels used in calculating the average value. When the pixels to be estimated are the pixels X 4 and X 8 processed in the processing for the first hierarchical level, the demultiplexer 22 does not operate.

A demultiplexer (DMUX 6) 23 outputs the pixel level value of the pixel for use in calculating the current line two-value average of the pixel to be compressed to the current line two-value average calculation module 25. The current line two-value average corresponding to the pixel to be estimated is indicated by A in FIG. 12, and the demultiplexer 23 outputs a pixel having a larger value between the two pixels used in calculating the average value. When the pixels to be estimated are the pixels X 4 and X 8 processed in the processing for the first hierarchical level, the demultiplexer 23 does not operate.

The two immediately above values average calculation module 24 calculates an average value between two-value in the vicinity immediately above the pixel to be compressed. The current line two-value average corresponding to the pixel to be estimated is indicated by A in FIG. 12. The two immediately above values average calculation module 24 does not operate when the pixels to be estimated are the pixels X 4 and X 8 processed in the processing for the first hierarchical level. Generally, the estimating system is higher in estimation accuracy by the interpolation estimate for estimation by already decompressed pixels enclosing the pixel to be estimated than by the extrapolating estimate for estimation of a pixel level value outside the pixel to be compressed and the already decompressed pixel level value. Therefore, if the interpolating process is performed on the reference value A in the previous line, the estimation accuracy may be furthermore improved.

The current line two-value average calculation module 25 calculates a pixel to be compressed and an average value between two values of two adjacent pixels. The current line two-value average calculation module 25 does not operate when the pixels to be estimated are the pixels X 4 and X 8 processed in the processing for the first hierarchical level. Generally, the estimating system has a higher estimation accuracy for the interpolation estimate when estimating using already decompressed pixels enclosing the pixel to be estimated than using the extrapolating estimate for estimation of a pixel level value outside the pixel to be compressed and the already decompressed pixel level value. Therefore, if the interpolating process is performed on the reference value A in the same line, the estimation accuracy may be further improved.

The estimated value calculation and selection module 26 calculates and selects an estimated value according to a control signal from the sequence control circuit 12$a$ on the basis of the pixel immediately above the pixel to be compressed, the two immediately above values' average, and a current line two-value average.

FIG. 13 illustrates a reference intermediate value and a corresponding estimated value. Only the pixel immediately above the pixel to be compressed is used in the processing for the first hierarchical level in calculating an estimated value by the estimated value calculation and selection module 26. However, in the processing in and after the processing for the second hierarchical level, the estimated value calculation and selection module 26 calculates the intermediate values with the current line two-value average set as A, the two immediately above values' average set as B, and the pixel immediately above set as C, and determines an estimated value to be used from among A, C, and A+C−B to satisfy the relationships illustrated in FIG. 13.

An estimated value 27 is an estimated value calculated by the estimated value calculation and selection module 26. A subtracter 28 subtracts the estimated value 27 from the pixel to be compressed output from the demultiplexer 15, and calculates an estimation error.

A quantizer 29 quantizes the estimation error as a difference value between the pixel to be compressed and the estimated value. The quantizer 29 receives the estimation error and outputs a quantization value and a quantization number. The estimation error, the estimation error quantization value, and the quantization number are associated with one another as illustrated in FIG. 14. According to the table in FIG. 14, the quantizer 29 outputs a corresponding estimation error quantization value and quantization number from the input estimation error.

An adder 30 adds the estimated value 27 to the estimation error quantization value output from the quantizer 29, calculates a decompressed pixel level value, and outputs it to a multiplexer (MUX 2) 31 and a multiplexer (MUX 3) 32.

The multiplexer (MUX 2) 31 outputs the decompressed pixel level values X 2, X 4, X 6, and X 8 to the pixel block 18 to be compressed.

The multiplexer (MUX 3) 32 sequentially outputs the decompressed pixel level values to the estimating line buffer 16.

A variable length coder 33 receives the quantization number output from the quantizer 29, converts it into a variable length code such as a Huffman code, etc., and outputs the code.

A compression code buffer 34 accumulates the variable length codes output from the variable length coder 33.

Described next is the operating process of the image data compression apparatus 100.

FIG. 15 is a flowchart of the operating process of the image data compression apparatus 100 according to an embodiment of the present invention when image data is compressed.

In FIG. 15, when the process is started and the image data 11 is input to the image data compression apparatus 100, the image data compression apparatus 100 first stores eight pixels of the image data 11 in the pixel block 14 to be compressed in step S1.

Next, in step S2, the image data compression apparatus 100 stores the pixel level values corresponding to the pixels X' −4, X' −3, X' −2, X' −1, X' 0, X' 1, X' 2, X' 3, X' 4, X' 5, X' 6, X' 7, and X' 8 in the immediately above block line memory.

Next, in step S3, the pixel block 14 to be compressed overwrites the pixel level values of the pixels X 4, X 6, and X 8 of a previous block according to the control signal from the sequence control circuit on the pixels X −4, X −2, and X 0.

In step S4, if the pixel to be compressed is the pixel X 4 or X 8 to be processed in the processing for the first hierarchical level (YES in step S4), then the processing for the first hierarchical level is performed instep S5, that is, the estimated value calculation and selection module 26 outputs as the estimated values 27 the pixel level values of the pixel immediately above X' 4 and X' 8 of the pixels to be processed X 4 and X 8 output from the demultiplexer (DMUX 2) 19.

Also in step S4, if the pixels to be compressed are not the pixels X 4 and X 8 to be processed in the processing for the first hierarchical level (NO in step S4), then the pixels are to be processed in and after the processing for the second hierarchical level. Therefore, to perform the MAP estimation, the two immediately above values' average calculation module 24 calculates the two immediately above values' average on the basis of the values selected and output by the demultiplexer (DMUX 3) 20 and the demultiplexer (DMUX 4) 21 in step S6, and the current line two-value average calculation module 25 calculates the current line two-value average on the basis of the values selected and output by the demultiplexer (DMUX 5) 22 and the demultiplexer (DMUX 6) 23 instep S7. Then, in step S8, the estimated value calculation and selection module 26 calculates an estimated value 26 using the pixel immediately above and the two immediately above values' average and the current line two-value average obtained in steps S6 and S7.

Next, in the image data compression apparatus 100, the subtracter 28 subtracts the estimated value 27 from the pixel level value of the pixel to be compressed, selected, and output by the demultiplexer (DMUX 1) from the pixel block 14 to be compressed in step S9, and calculates an estimation error. Then, in step S10, the quantizer 29 quantizes the estimation error calculated in step S9, and outputs an estimation error quantization value and a quantization number. Then, in the image data compression apparatus 100, the adder 30 adds the estimation error quantization value to the estimated value 27 in step S11, obtains a decompressed pixel, and outputs it to the multiplexer (MUX 2) 31 and the multiplexer (MUX 3) 32.

When the pixels to be compressed are X 2, X 4, X 6, and X 8 (YES in step S12), the multiplexer (MUX 2) 31 holds the decompressed pixels of the pixels X 2, X 4, X 6, and X 8 in the pixel block 18 to be compressed in step S13. If the pixels to be compressed are other than X 2, X 4, X 6, and X 8 in step S12 (NO in step S12), then the processes in step S13 are omitted. Then, in the image data compression apparatus 100, the multiplexer (MUX 3) 32 passes the decompressed pixels to the estimating line buffer 16 in step S14.

Finally, in the image data compression apparatus 100, the variable length coder 33 generates a code on the basis of the quantization number. The type of the code used in this process may be a Golomb code or an arithmetic code.

When the above-mentioned processes in step S1 through S15 are performed on the certain image data and all image data are completely processed, the entire processing is terminated.

Thus, in the image compression by the image data compression apparatus 100, the pixels in a line are divided into blocks each including 2n (n=3 in the examples above), and the processing timing is shifted in every hierarchical level in a block, thereby solving the bottleneck in processing speed in the estimating process. As for the high resolution components (second and third hierarchical levels), high precision estimation may be realized because of the execution of the calculation of an intermediate value by reference to and interpolation of a decompressed value of the previous line and the previous hierarchical level.

Described next is the image data decompression apparatus according to the present embodiment.

Figure 16:
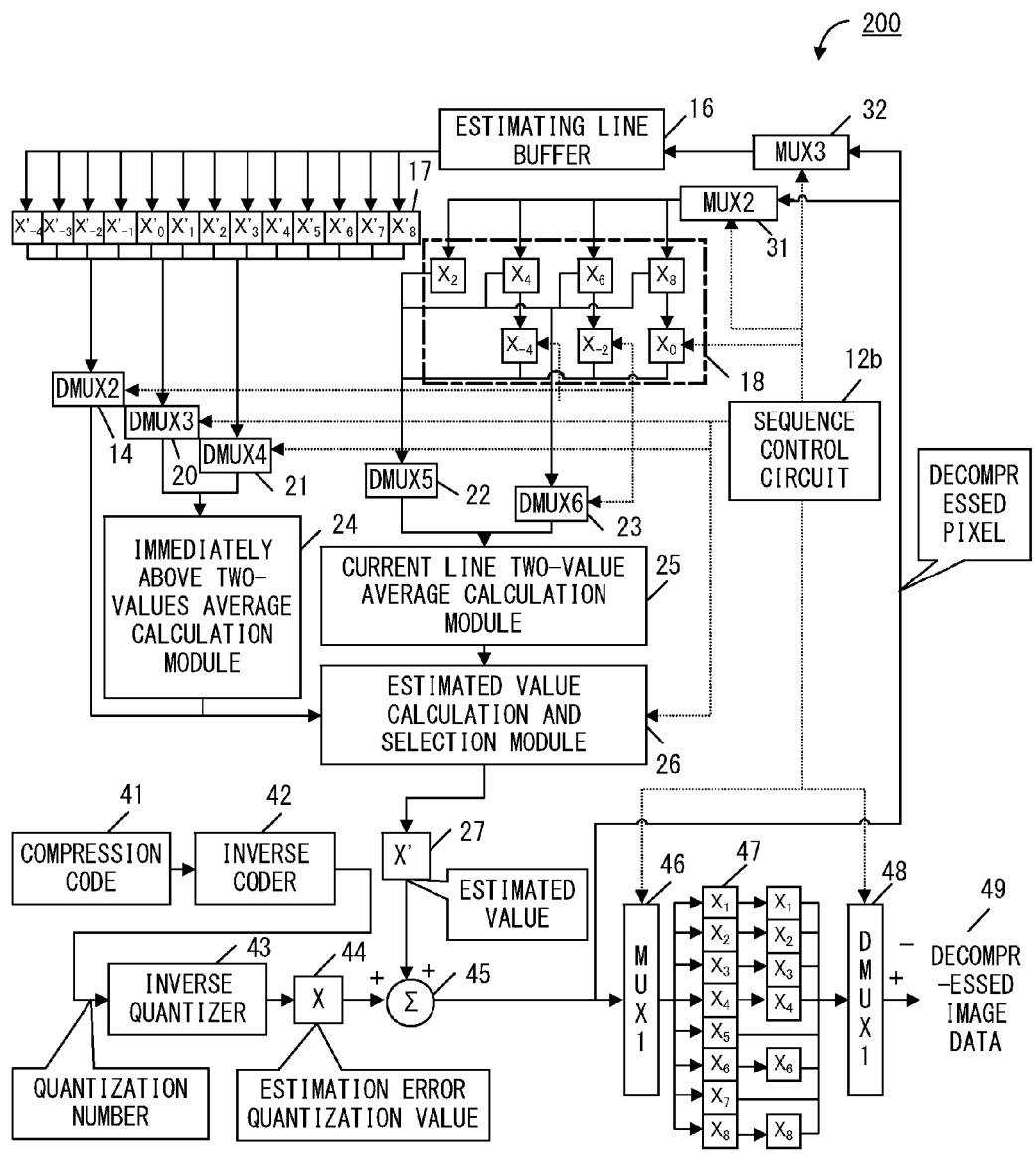
FIG. 16 is an example of a configuration of the image data decompression apparatus according to an embodiment of the present invention.

FIG. 16 is an example of a configuration of the image data decompression apparatus 200 according to the present embodiment.

In the components in FIG. 16, the components of the portion for obtaining the estimated value 27 have basically the same operation as the components of the image data compression apparatus 100, and are assigned the same reference numerals. Detailed descriptions of these components are omitted here.

In FIG. 16, the compression code 41 is obtained by coding image data, and is to be decompressed by the image data decompression apparatus 200 according to the present embodiment. An inverse coder 42 receives the compression code 41, and outputs a quantization number corresponding to the compression code 41. An inverse quantizer 43 receives the quantization number output from the inverse coder 42, and outputs an estimation error quantization value 44. The quantization number and the estimation error quantization value have the relationship illustrated in FIG. 17, and it is obviously the same as the relationship between the estimation error quantization value and the quantization number illustrated in FIG. 14. The inverse quantizer 43 outputs the estimation error quantization value 44 corresponding to the input quantization number. The estimation error quantization value 44 is a quantization value of the estimation error output from the inverse quantizer 43.

A sequence control circuit 12b controls the order of processing of eight pixels of a block to be decompressed by outputting a control signal to control the output of each multiplexer (MUX) and demultiplexer (DMUX). In the image data decompression apparatus 200, the order of processing pixels is pixels X 4, X 8, X 5, X 2, X 6, X 7, X 1, and X 3, which is similar to the order illustrated in FIG. 10. However, to maintain appropriate processing timing, the pixels X 5 and X 7 are processed using the pixels in the immediately previous block.

An adder 45 adds the estimated value 27 to the estimation error quantization value 44 and calculates a decompressed pixel level value. A multiplexer (MUX 1) 46 allocates the pixel decompressed pixel by pixel sequentially to a decompression completion pixel block 47. The decompression completion pixel block 47 holds a pixel level value for which the decompression is completed in the current decompressing process. A demultiplexer (DMUX 1) 48 rearranges the pixel data in the decompression completion pixel block 47 in the order of the data before the compression (X 1, X 2, X 3, X 4, X 5, X 6, X 7, and X 8) and outputs the data. Decompressed image data 49 is a result of the decompression by the image data decompression apparatus 200.

Described next is the operation of the image data decompression apparatus 200 illustrated in FIG. 16 when the compressed data is decompressed.

Figure 18:
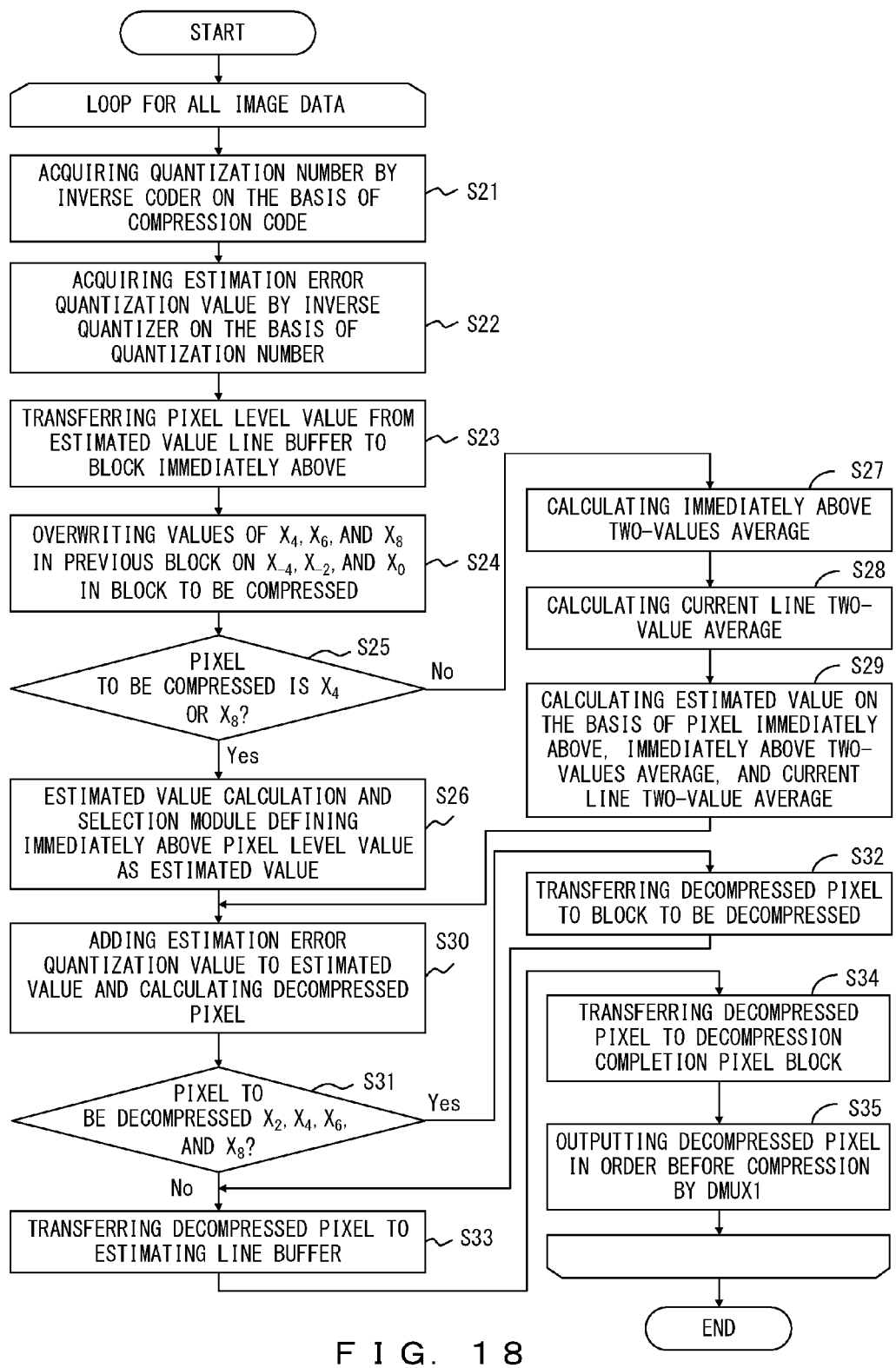
FIG. 18 is a flowchart of the operating process of the image data decompression apparatus according to an embodiment of the present invention when compressed data is decompressed.

FIG. 18 is a flowchart of the operating process of the image data decompression apparatus 200 according to the present embodiment when compressed data is decompressed.

In FIG. 18, when the compression code 41 is input to the image data decompression apparatus 200 and the processing is started, the inverse coder 42 obtains a quantization number on the basis of the input compression code 41 first in step S21.

Next, in step S22 in the image data decompression apparatus 200, the inverse quantizer 43 obtains the estimation error quantization value 44 on the basis of the quantization number obtained in step S21.

Then, in step S23, the immediately above block line memory 17 holds the pixel level values corresponding to the pixels X' −4, X' −3, X' −2, X' −1, X' 0, X' 1, X' 2, X' 3, X' 4, X' 5, X' 6, X' 7, and X' 8 output from the estimating line buffer 16. In step S24, in the pixel block 18 to be compressed, the values of the pixels X 4, X 6, and X 8 of the previous block are overwritten on the X −4, X −2, and X 0 on the basis of the control signal from the sequence control circuit 12b.

Next, in step S25, the image data decompression apparatus 200 determines whether or not the pixel to be decompressed is X 4 or X 8. If the pixel is X 4 or X 8 (YES in step S25), the estimated value calculation and selection module 26 outputs the pixel level value of the pixel immediately above the pixel to be compressed and output from, the demultiplexer (DMUX 2) 19 as the estimated value 27.

If the pixel to be decompressed is not X 4 or X 8 in step S25 (NO in step S25), then the two immediately above values' average calculation module 24 calculates the selected two immediately above values' average from the values selected and output by the demultiplexer (DMUX 3) 20 and the demultiplexer (DMUX 4) 21, and outputs the result of the calculation to the estimated value calculation and selection module 26 in step S27. Next, in step S28, the current line two-value average calculation module 25 calculates a reference value from the value selected and output by the demultiplexer (DMUX 5) 22 and the demultiplexer (DMUX 6) 23, and outputs the value to the estimated value calculation and selection module 26. In step S29, the estimated value calculation and selection module 26 obtains the estimated value 27 with reference to FIGS. 12 and 13 on the basis of the two immediately above values' average obtained in step S27 and the current line two-value average obtained in step S28.

When the estimated value 27 is obtained in step S26 or S29, the adder 45 adds in step S30 the estimation error quantization value 44 to the estimated value 27 obtained in step S22 in the image data decompression apparatus 200, and calculates a decompressed pixel.

When the decompressed pixels calculated in step S30 are pixels X 2, X 4, X 6, and X 8 (YES in step S31), the multiplexer (MUX 2) 31 inputs the pixels to the pixel block 18 to be compressed. If they are decompressed pixels of other pixels (NO in step S31), then step S31 is omitted.

Next, in the image data decompression apparatus 200, the multiplexer (MUX 3) 32 inputs the decompressed pixels to the estimating line buffer 16.

The image data decompression apparatus 200 inputs all decompressed pixels to the decompression completion pixel block 47 in step S34. Then, in step S35, the demultiplexer (DMUX 1) 48 outputs the decompressed pixels in the decompression completion pixel block 47 in the order before the compression (X 1, X 2, X 3, X 4, X 5, X 6, X 7, and X 8).

Afterwards, the processing in steps S21 through S35 is repeated on all image data, and when the decompressing process is completed on all image data, the present processing is terminated.

As described above, in the decompressing process by the image data decompression apparatus 200 according to the present embodiment, the pixels in a line are divided into blocks, and the processing timing is shifted for each hierarchical level in the block, thereby solving the bottleneck in processing speed of an estimating process. As for the high resolution components (second and third hierarchical levels), high precision estimation may be realized because of the execution of the calculation of an intermediate value by reference to and interpolation of a decompressed value of the previous line and the previous hierarchical level.

Described next is exception handling in the image data compressing process and decompressing process in the present embodiment.

FIG. 19 illustrates the position of the image data in one frame when exception handling is performed in the image data compressing process and decompressing process in the present embodiment.

In the positions of (1) through (4) in FIG. 19 at the edge of one frame, not all reference values are presented, and exception handling is performed for estimation.

Since the positions (1) and (4) in the first line of the image data include no immediately above local decode values, a median among the reference values A through C is not used, but instead a value illustrated in FIG. 21 is used as an estimated value.

In FIG. 20, 0×80 refers to 80 in hexadecimal notation, and corresponds to 128 in decimal notation. 128 is half the value of 256 gradations of gray scale for the pixels.

For the pixels in the position (1) in FIG. 19, there is no immediately previous pixel for an extrapolating process when the processing for the first hierarchical level is performed. Therefore, the extrapolating process is performed by assuming that the value 128 (0×80) exists so as to obtain an estimated value. In the position (2) in FIG. 19, the value of the corresponding pixel of the previous block is used as an estimated value.

In the processing for the second and third hierarchical levels, the interpolating process is performed to obtain an estimated value by assuming that there are 0×80 gray-scale gradations (128 in decimal notation, which is half the value of 256 gray-scale gradations) in the position of a non-existent pixel.

For the pixel at position (3) corresponding to the leading block in and after the second line, a reference value is configured by using the substitute pixel illustrated in FIG. 21.

FIG. 21 is an example of a substitute pixel when an estimated value of the pixel in the leftmost position of (3) illustrated in FIG. 19 is obtained. When an estimated value of a target pixel block 51 is obtained, the value of the pixel X' 1 is used as a substitute pixel in the position of the pixel X' 0 of a pixel immediately above 52 and the position of the pixel X 0 of a process line 53.

Similarly, when an estimated value of the pixel in position (4) corresponding to the last block in FIG. 19 is obtained, a reference value is configured by using substitute pixels in the positions of X' 9 and X9.

Thus, in the image data compressing process and decompressing process according to the present embodiment, an end portion of the frame of image data may be processed.

Figure 22:
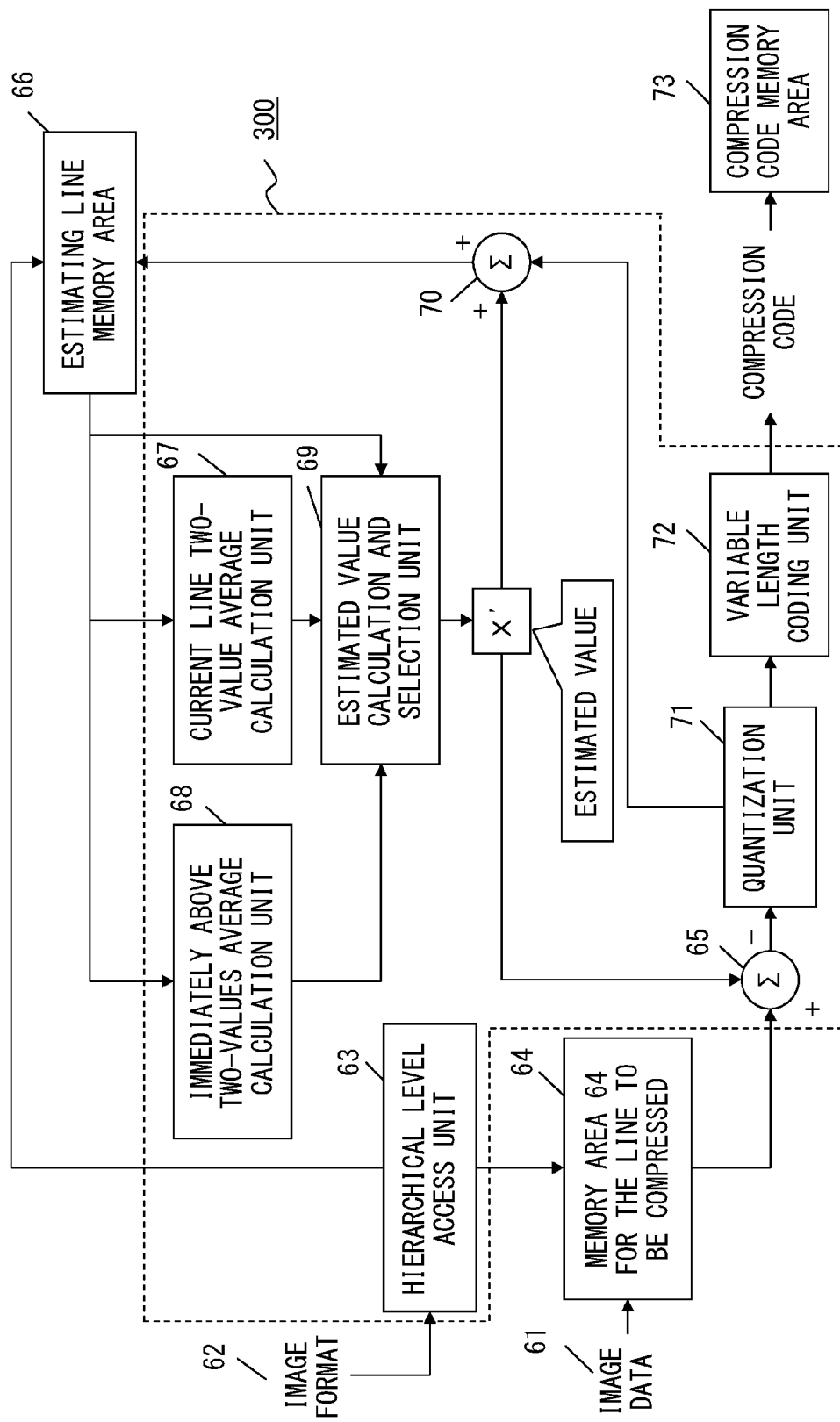
FIG. 22 is an example of a program configuration of a data compression program in an embodiment of the present invention.

Described below is the case where the image data compressing process according to the present embodiment is performed by a program FIG. 22 is an example of a program configuration of a data compression program 300 in the present embodiment. The configuration unit of the data compressing program 300 in FIG. 22 is realized by the CPU executing the data compressing program 300 in the memory.

The data compressing program 300 may be configured as one program or as a program group formed by a plurality of programs.

In FIG. 22, image data 61 is the data of pixels (gray scale values) to be compressed by the data compressing program 300 according to the present embodiment. The image data 61 is input to the data compressing program 300 in the line direction. An image format 62 is the information about the horizontal image size of the image data 61, and is input into the data compressing program 300 when the data compressing process is performed.

A hierarchical level access unit 63 is a program unit for classifying each pixel into a hierarchical level on the basis of the horizontal image size of the frame of an image, and accessing each piece of pixel data to perform a coding process for each hierarchical level.

When the hierarchical level is N, the following classification is performed. In the present embodiment, the processes are not to be concurrently performed, unlike the case in which the compressing process is performed by hardware as described above. Therefore, the blocks are divided and a pixel is selected in each hierarchical level as follows, unlike in the conventional methods.

the number of pixels in each block: $2^{N-1}$ (half size of a normal block)

first hierarchical level: There is one first hierarchical level in each block, and the rightmost pixel in the block is selected.

second hierarchical level: There is one second hierarchical level in each block, and the $2^{N-2}$-th pixel from the leftmost pixel in the block is selected.

i-th hierarchical level: There are $2^{i-2}$ hierarchical levels in each block, and the pixels are selected from the $2^{N-1}$-th pixel from the leftmost pixel in the block, and every third pixel is selected toward the rightmost pixel.

A memory area 64 for the line to be compressed holds a level value of the pixel of the line to be compressed in the current step, and is provided in the memory area of the information processing device by the data compressing program 300.

An estimating line memory area 66 holds the decompressed pixel level value of the immediately previous line to the process line, and is provided in the memory area of the information processing device by the data compressing program 300.

A current line two-value average calculation unit 67 is a program unit for calculating the pixel to be compressed and an average value of the two adjacent values. The calculating process is performed in and after the second hierarchical level, and the calculating method is expressed as follows.

the current line two-value average "C" of the pixel Xj in the i-th hierarchical level: $(Xk+Xl)/2, *k=j+2^{N-2}, l=j-2^{N-2}$ A two immediately above values average calculation unit 68 is a program unit for calculating an average value of two values in the vicinity immediately above the pixel to be compressed. The calculation is also performed in and after the second hierarchical level, and the calculating method is described as follows.

the two immediately above values average "B" of the pixel Xj in the i-th hierarchical level: (X' k+X' l)/2,* k=j+2$^{N-2}$, l=j−2$^{N-2}$ An estimated value calculation and selection unit 69 is a program unit for calculating and selecting an estimated value on the basis of the pixel immediately above, the two immediately above values average, and the current line two-value average. Only the pixel immediately above is used in the processing for the first hierarchical level, but the intermediate value among A as the current line two-value average, B as the two immediately above values average, and C as the pixel immediately above is calculated for the processing for and after the second hierarchical level, and determines an estimated value to be used among A, C, and A+C−B to correspond to the table in FIG. 12.

The calculating method in and after the processing for the second hierarchical level is described below.

the pixel immediately above "A" of the pixel Xj in the i-th hierarchical level: X'j the two immediately above values average "B" of the pixel Xj in the i-th hierarchical level: (X' k+X' l)/2,*k=j+2$^{N-2}$, l=j−2$^{N-2}$ the current line two-value average "C" of the pixel Xj in the i-th hierarchical level: (X' k+X' l)/2*, k=j+2$^{N-2}$, l=j−2$^{N-2}$ A subtraction unit 65 subtracts an estimated value calculated by the estimated value calculation and selection unit 69 from the pixel level value of the pixel to be compressed read from the memory area 64 for the line to be compressed.

A quantization unit 71 is a program unit for quantizing an "estimation error" as a difference between the pixel to be compressed and the estimated value. The quantization unit 71 receives the estimation error and outputs an estimation error quantization value and a quantization number. The relationship among the estimation error, the estimation error quantization value, and the quantization number are illustrated in FIG. 14.

A variable length coding unit 72 is a program unit for receiving a quantization number, and outputting a variable length code.

A compression code memory area 73 is a buffer for accumulating a variable length code output from the variable length coding unit 72 as a compression code. The compression code memory area 73 is reserved by the data compressing program 300 in the memory of the information processing device for executing the data compressing program 300.

Described next is the operating process performed when the data compressing program 300 compresses image data.

FIG. 23 is a flowchart of the operating process of the data compression program 300 when image data is compressed. The process illustrated in FIG. 23 is realized by the CPU of the information processing device executing the data compressing program 300 on the memory.

When the process in FIG. 23 is started, one line of the image data 61 is stored in the memory area 64 for the line to be compressed first in step S41.

Next, in step S42, one block of pixels to be compressed is classified into pixels to be processed in the processing for the N-th hierarchical level.

Next, in step S43, the estimated value calculation and selection unit 69 reads data from the estimating line memory area 66.

If the current process is the processing for the first hierarchical level (YES in step S44), the estimated value calculation and selection unit 69 defines the pixel level value of the pixel immediately above the pixel to be compressed as an estimated value as the processing for the first hierarchical level in step S45.

In step S44, if the current process is the processing for the second or subsequent hierarchical level (NO in step S44), the two immediately above values average calculation unit 68 calculates a two immediately above values average in step S46, the current line two-value average calculation unit 67 calculates a current line two-value average in step S47, and an estimated value of the pixel to be compressed is obtained in step S49 using the two immediately above values average calculated in step S46 and the current line two-value average calculated in step S47.

When the estimated value is obtained in step S45 or S48, the subtraction unit 65 subtracts the estimated value from the pixel level value of the pixel to be compressed and calculates an estimation error in step S49. Then, in step S50, the quantization unit p71 quantizes the estimation error obtained in step S49, and obtains a quantization value and a quantization number.

Then, in step S51, an addition unit 70 adds the quantization value obtained in step S50 to the estimated value obtained in step S45 or S48, and calculates a decompressed pixel. In step S52, the decompressed pixel is stored in the estimating line memory area 66.

Finally, in step S53, the variable length coding unit 72 converts data into a variable length code, generates a compression code, and stores it in the compression code memory area 73. The compression code may be a Golomb code or an arithmetic code.

The processes in steps S43 through S53 are performed in the processing for the first hierarchical level on all blocks in one line, and the processing is performed on each hierarchical level.

When the processes in S41 through S53 are performed on all image data, and a compression code is generated, the current processing is terminated.

In the processing, the image data compression according to the present embodiment may be performed by software rather than hardware.

In the processing in FIG. 23, when a pixel to be compressed corresponds to the portions (1), (2), (3), and (4) in FIG. 19, exception handling is performed.

In the exception handling, if the pixels correspond to the portions (1) and (2) in the first line, there is no local decode value immediately above. Therefore, the following value is defined as an estimated value without using the central value among the reference values A through C in FIG. 12. The portions (3) and (4) corresponding to the leading and trailing blocks in the second and subsequent lines configure a reference value by using the following substitute pixels. The portions (1) and (2) are described above with reference to FIG. 21.

FIG. 24A illustrates an estimated value calculated in the position of (3) illustrated in FIG. 19.

In this case, an estimated value of each block 83 is obtained by assuming that there is a pixel having a pixel level value of the leftmost pixel of the previous line 81 to the left end of the previous line 81 and the current line 82.

Figure 24B:
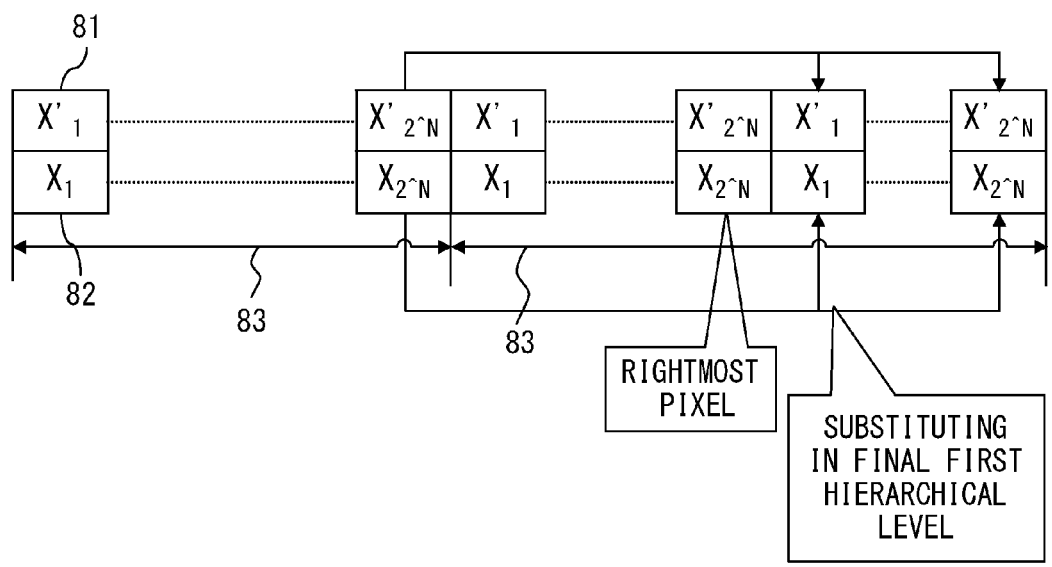
FIG. 24B illustrates an estimated value calculated in the position of (3) illustrated in FIG. 19.

FIG. 24B illustrates an estimated value calculated in the position of (4) illustrated in FIG. 19.

In this case, for the number of pixels short in one block at the right end of the previous line 81 and the current line 82, it is assumed that there is a pixel of the pixel level value at the right end of the immediately previous block, and an estimated value of each block 83 is obtained.

Described next is the image data decompressing process according to the present embodiment being performed by a program.

FIG. 25 is an example of a program configuration of the data decompression program 400 according to the present embodiment. The configuration unit of the data decompressing program 400 in FIG. 25 is realized by the CPU executing the data compressing program 300 in the memory.

The data decompressing program 400 may be configured as one program or as a program group formed by a plurality of programs.

In the components in FIG. 25, the components for obtaining an estimated value perform basically the same operations as the components of the data compressing program 300 in FIG. 22, and are assigned the same reference numerals. Therefore, detailed descriptions are omitted for these components.

In FIG. 25, a compression code 91 is coded image data, and is to be decompressed by the data decompressing program 400. An inverse coding unit 92 is a program unit for converting the compression code 91 into a corresponding quantization number. An inverse quantization unit 93 converts the quantization number converted by the inverse quantization unit 93 into an estimation error quantization value. The quantization number and the estimation error quantization value have the relationship illustrated in FIG. 17 as described above, and the inverse quantization unit 93 converts the quantization number into the estimation error quantization value. An addition unit 94 is a program unit for adding the estimation error quantization value to the estimated value and obtaining a decompressed pixel. A completely decompressed pixel block area 95 is a memory area for storing pixel level values of decompressed pixels in one block, and is reserved by the data decompressing program 400 in the memory of the information processing device for executing the data decompressing program 400. A sequence conversion unit 96 is a program unit for reading a pixel level value from the completely decompressed pixel block area 95 in the order before the compression.

Described next is the operating process performed when the data decompressing program 400 illustrated in FIG. 25 decompresses image data.

Figure 26:
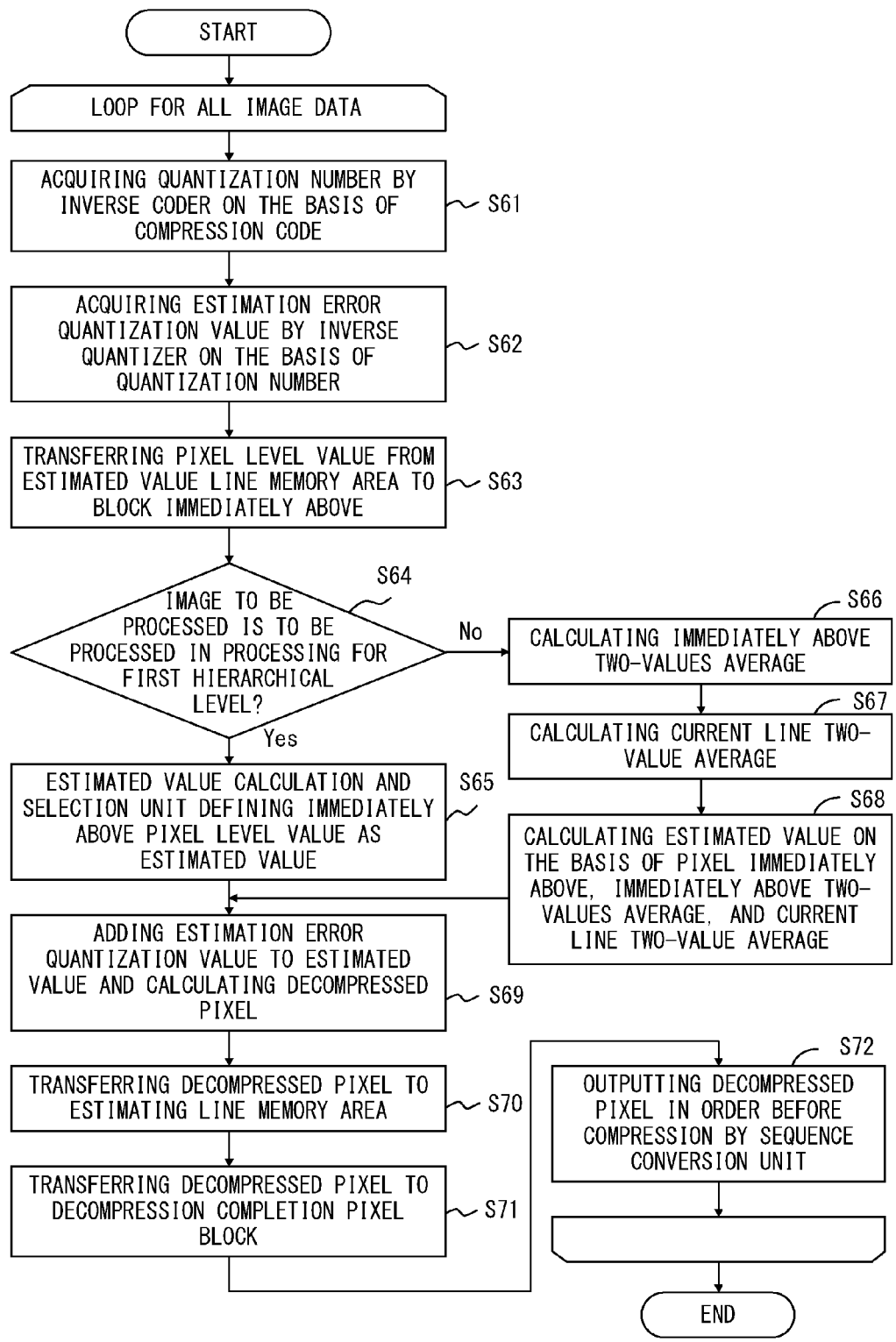
FIG. 26 is a flowchart of the operating process of a data decompressing program 400 when image data is decompressed.

FIG. 26 is a flowchart of the operating process of a data decompressing program 400 when image data is decompressed. The process in FIG. 26 is realized by the CPU of the information processing device executing the data decompressing program 400 in the memory.

When the process in FIG. 26 is started, the inverse coding unit 92 first converts the compression code 91 into a quantization number in step S61.

Next, in step S62, the inverse quantization unit 93 acquires an estimation error quantization value based on the quantization number obtained in step S61.

Next, in step S63, the estimated value calculation and selection unit 69 reads the pixel level value of the block immediately above the block to be decompressed from the estimated value line memory area.

If the current pixel to be processed is processed in the processing for the first hierarchical level (YES instep S64), then the estimated value calculation and selection unit 69 outputs the pixel level value of the pixel immediately above the pixel to be processed as an estimated value in step S65.

If the current pixel to be processed is a pixel other than the pixel to be processed in the processing for the first hierarchical level (NO in step S64), then the two immediately above values average calculation unit 68 calculates a two immediately above values average in step S65, the current line two-value average calculation unit 67 calculates a current line two-value average in step S66 and obtains an estimated value of the pixel to be compressed using the two immediately above values average calculated in step S66 and the current line two-value average calculated in step S67 in step S68.

If the estimated value is obtained in step S65 or S68, the addition unit 94 adds the pixel level value of the pixel to be compressed to the estimated value, and calculates a decompressed pixel in step S69.

Then, in step S70, the decompressed pixel calculated in step S69 is stored in the estimating line buffer memory area 65, and stores the decompressed pixel in the completely decompressed pixel block area 95 in step S71.

Finally, the sequence conversion unit 96 reads the pixel level value of the decompressed pixel from the completely decompressed pixel block area 95 in the order of the image data before the compression, and outputs the value. The output value is decompressed image data.

The decompressing process by the data decompressing program 400 is completed by repeating the processes in steps S61 through S72 for each piece of all-compressed image data.

Thus, the image data decompressing process according to the present embodiment may also be realized using software by executing the data decompressing program 400.

Figure 27:
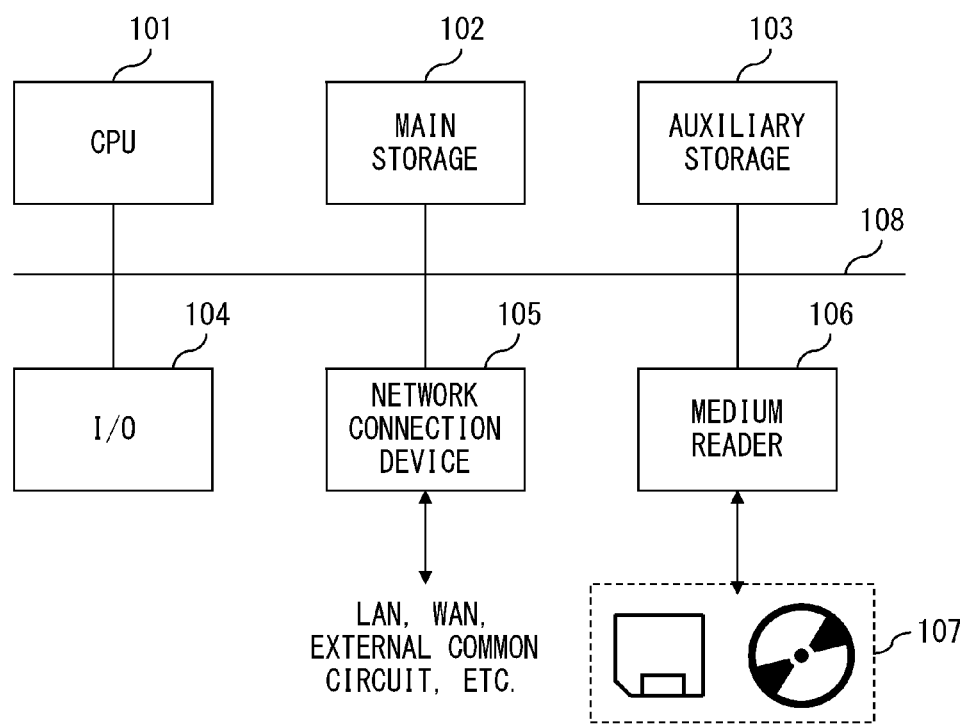
FIG. 27 illustrates a system environment of the information processing device for executing a data compressing program and a data decompressing program.

FIG. 27 illustrates a system environment of the information processing device for executing the data compressing program 300 and the data decompressing program 400.

In FIG. 27, the information processing device includes a CPU 101, main storage 102 such as RAM etc., auxiliary storage 103 such as a hard disk etc., an input/output device (I/O) 104 such as a display, a keyboard, a pointing device, etc., a network connection device 105 such as a communication interface, a modem, etc., and a medium reader 106 for reading stored content from a portable storage medium such as a disk, a magnetic tape, etc. These components are connected via a bus 108. Each component communicates data with other components over the bus 108.

The CPU 101 executes a program on the auxiliary storage 103 and a program installed through the network connection device 105 by using the main storage 102 as work memory, thereby realizing the function of each component of the data compressing program 300 and the data decompressing program 400 illustrated in FIGS. 22 and 25, and realizing the processes according to the flowcharts illustrated in FIGS. 23 and 26.

In the information processing device illustrated in FIG. 27, a medium reader 107 reads a program and data stored in the storage medium 108 such as a magnetic tape, a flexible disk, CD-ROM, an MO, a DVD, etc., and loads them into a connection management server 10 in the present embodiment through the medium reader 106. The program and data is stored in the main storage 102 and the auxiliary storage 103, and executed and used by the CPU 101, hereby realizing the processes according to the flowcharts as if the operation were performed by software.

In the information processing device illustrated in FIG. 27, application software may be exchanged using the medium reader 107 such as a CD-ROM etc. Therefore, the present invention is not limited to the image data compression apparatus, decompression apparatus, compressing process, decompressing process, or program, but may be configured as a computer-readable storage medium 107 and program used to direct a computer to perform the function according to the above-mentioned embodiments of the present invention when it is used by the computer.

Figure 28:
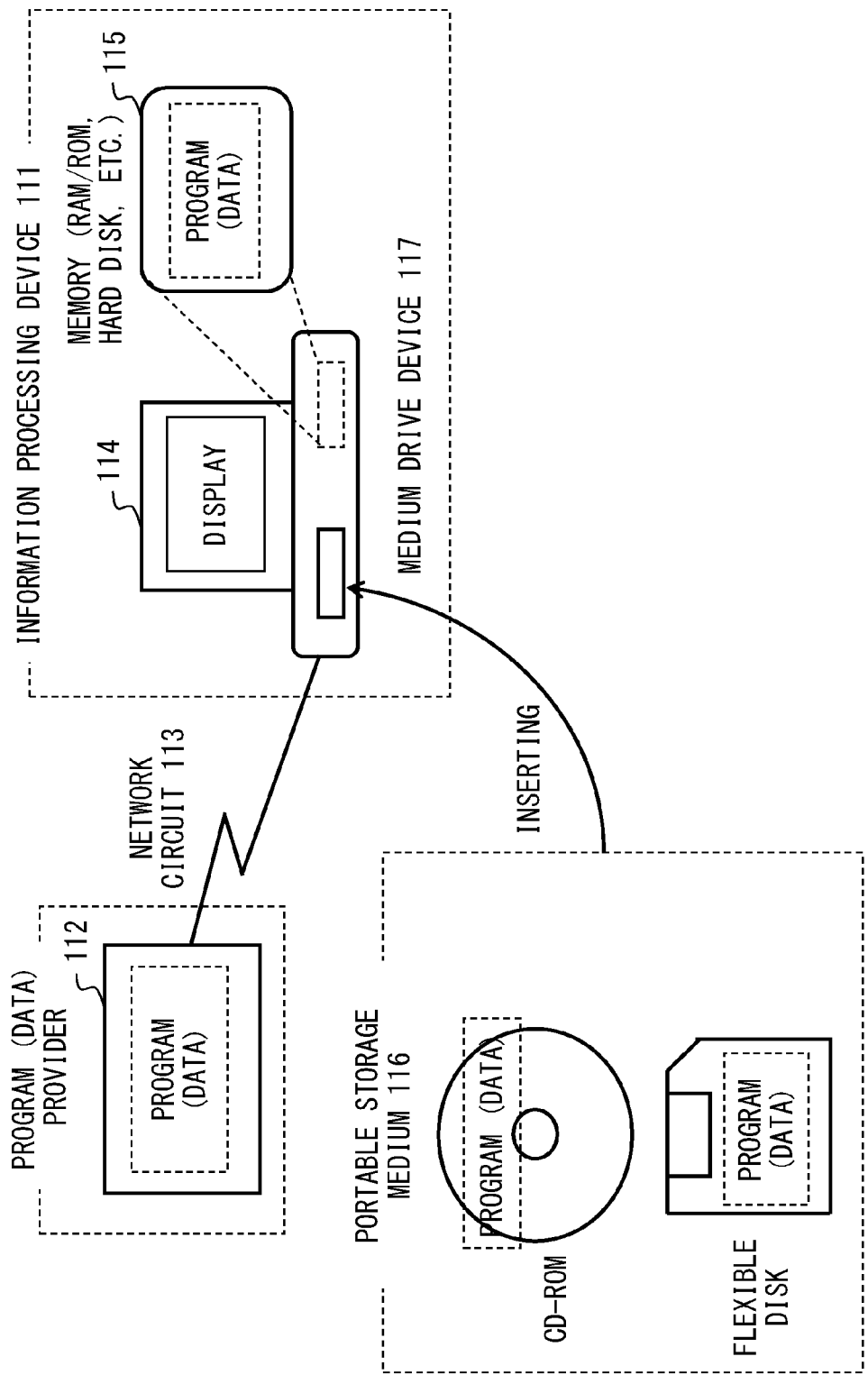
FIG. 28 is an example of a storage medium.

In this case, as illustrated in FIG. 28, the "storage medium" may be a portable storage medium 116 that may be attached to and detached from a medium drive device 117 such as a CD-ROM, a flexible disk (or an MO, DVD, a memory card, a removable hard disk, etc.), a storage unit (database etc.) 112 in an external device (a server etc.) transmitted through a network circuit 113, or memory (RAM or hard disk etc.) 115 in a body 114 of an information processing device 111, etc. A program stored in the portable storage medium 116 and the storage unit (database etc.) 112 is loaded into the memory (RAM or hard disk etc.) 115 in the body 114 and executed.

The storage medium such as the above-mentioned CD-ROM, DVD-ROM may be, in addition to the above-mentioned examples, a next generation optical disk storage media using blue lasers such as Blue-ray Disc (registered trademark), AOD (advanced optical disc), etc., a next generation optical disk storage media using red lasers such as HD-DVD9, Blue Laser DVD and hologram using blue-violet lasers, etc., to embody the present invention using various types of large capacity storage mediums to be developed hereafter.

As described above, according to the present invention, the pixels in a line are divided into blocks, and the processing timing is shifted in every hierarchical level in a block, thereby solving the bottleneck problem in processing speed in the estimating process. As for the high resolution components (second and third hierarchical levels), high precision estimation may be realized because of the execution of the calculation of an intermediate value by reference to and interpolation of a decompressed value of the previous line and the previous hierarchical level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An image compression apparatus, comprising:
    a line memory unit to hold pixel values for at least one immediately previous line in lines to be processed of an image to be compressed;
    a division unit to divide pixels of the line to be processed into $2^n$-pixel blocks;
    a first estimation value calculation unit to extrapolation-estimate a $2^{n-1}$-th pixel and a $2^n$-th pixel in the blocks divided by the division unit using, as reference values, values of pixels immediately above the $2^{n-1}$-th pixel and the $2^n$-th pixel respectively, and to obtain an estimated value in processing for a first hierarchical level;
    a second estimation value calculation unit to interpolation-estimate certain pixels using, as reference values, pixel values of one immediately previous line in the line memory and estimated values obtained up to processing for an immediately previous hierarchical level, and to obtain an estimated value in processing for a second hierarchical level through processing for an n-th hierarchical level; and
    an estimation coding unit to obtain an estimation error from the estimated value obtained in the processes from the processing for the first hierarchical level to the processing for the n-th hierarchical level, to convert the estimation error into a quantization number, to convert the quantization number into a variable length code, and to obtain a compression code.

2. The apparatus according to claim 1, wherein
in processing for a k-th (k=2 through n) hierarchical level, the certain pixel to be processed by the second estimation value calculation unit is an intermediate pixel of the estimated values obtained by the first estimation value calculation unit and the second estimation value calculation unit up to processing for an n-th hierarchical level.

3. The apparatus according to claim 2, wherein
with n=3,
the division unit divides pixels with eight pixels grouped as one block;
the first estimation value calculation unit obtains estimated values for a fourth pixel and an eighth pixel in the block in the processing for the first hierarchical level;
the second estimation value calculation unit obtains estimated values for a second pixel and a sixth pixel in the block in the processing for the second hierarchical level, and obtains estimated values for a first pixel, a third pixel, a fifth pixel, and a seventh pixel in the block in the processing for the third hierarchical level.

4. The apparatus according to claim 1, wherein
the interpolation estimate performed by the second estimation value calculation unit is a median adaptive predictor (MAP).

5. The apparatus according to claim 4, wherein
the second estimation value calculation unit defines a reference value as the estimated value obtained in processing for an immediately previous hierarchical level in a line to be processed of the image to be compressed as A, defines a reference value as a pixel value of a pixel immediately above a pixel to be compressed in the line memory unit as C, defines a reference value as a pixel value of a pixel immediately above the estimated value obtained in processing for an immediately previous hierarchical level in the line memory unit as B, calculates intermediate values above, determines an estimated value of C when the intermediate value is A, determines an estimated value of A +C −B when the intermediate value is B, and determines an estimated value of A when the intermediate value is C.

6. The apparatus according to claim 5, wherein
the reference value A is an average value of two pixels in a vicinity obtained in processing for an immediately previous hierarchical level in a same line.

7. The apparatus according to claim 5, wherein
the reference value B is an average value of two pixels in a vicinity obtained in processing for an immediately previous hierarchical level in one immediately previous line.

8. The apparatus according to claim 1, wherein
the second estimation value calculation unit starts processing for a (k+1)th hierarchical level before completing processing for a k-th (k=1 through n-1) hierarchical level.

9. The apparatus according to claim 1, wherein
the first estimation value calculation unit and the second estimation value calculation unit start a next block before completing processing for one immediately previous block.

10. The apparatus according to claim 1, wherein
the first estimation value calculation unit and the second estimation value calculation unit process pixels in an order in which they were input for processing for a same hierarchical level.

11. An image decompression apparatus, comprising:
a line memory unit to hold pixel values for at least one immediately previous line in lines to be processed of an image to be decompressed;
a division unit to divide pixels of the line to be processed into $2^n$-pixel blocks;
a first estimation value calculation unit to extrapolation-estimate a $2^{n-1}$-th pixel and a $2^n$-th pixel in the blocks divided by the division unit using, as reference values, values of pixels immediately above the $2^{n-1}$-th pixel and the $2^n$-th pixel, respectively, and to obtain an estimated value in processing for a first hierarchical level;
a second estimation value calculation unit to interpolation-estimate certain pixels using, as reference values, pixel values of one immediately previous line in the line memory and estimated values obtained up to processing for an immediately previous hierarchical level, and to obtain an estimated value in processing for a second hierarchical level through processing for an n-th hierarchical level; and
a decompressed pixel value calculation unit to obtain a quantization number from a compression code, to obtain an estimation error quantization value from the quantization number, and to obtain a pixel value of a decompressed pixel using the estimation error quantization value and an estimated value obtained by the first estimation coding unit or an estimated value obtained by the second estimation value calculation unit.

12. The apparatus according to claim 11, wherein in processing for a k-th (k=2 through n) hierarchical level, the certain pixel to be processed by the second estimation value calculation unit is an intermediate pixel of the estimated values obtained by the first estimation value calculation unit and the second estimation value calculation unit up to processing for an n-th hierarchical level.

13. The apparatus according to claim 11, wherein
the second estimation value calculation unit defines a reference value as the estimated value obtained in processing for an immediately previous hierarchical level in a line to be processed of the image to be compressed as A, defines a reference value as a pixel value of a pixel immediately above a pixel to be compressed in the line memory unit as C, defines a reference value as a pixel value of a pixel immediately above the estimated value obtained in processing for an immediately previous hierarchical level in the line memory unit as B, calculates intermediate values above, determines an estimated value of C when the intermediate value is A, determines an estimated value of A +C −B when the intermediate value is B, and determines an estimated value of A when the intermediate value is C.

14. The apparatus according to claim 12, wherein
the reference value A is an average value of two pixels in a vicinity obtained in processing for an immediately previous hierarchical level in a same line.

15. The apparatus according to claim 12, wherein
the reference value B is an average value of two pixels in a vicinity obtained in processing for an immediately previous hierarchical level in one immediately previous line.

16. A computer-readable, non-transitory storage medium storing a program used in an information processing device for performing the processes, comprising:
holding pixel values for at least one immediately previous line in lines to be processed of an image to be compressed;
dividing pixels of the line to be processed into $2^n$-pixel blocks;
extrapolation-estimating a $2^{n-1}$-th pixel and a $2^n$-th pixel in the divided blocks using, as reference values, values of pixels immediately above the $2^{n-1}$-th pixel and the $2^n$-th pixel, and obtaining an estimated value in processing for a first hierarchical level;
interpolation-estimating certain pixels using, as reference values, pixel values of one immediately previous line and estimated values obtained up to processing for an immediately previous hierarchical level, and obtaining an estimated value in processing for a second hierarchical level through processing for an n-th hierarchical level; and
obtaining an estimation error from the estimated value obtained in the processes from the processing for the first hierarchical level to the processing for the n-th hierarchical level, converting the estimation error into a quantization number, converting the quantization number into a variable length code, and obtaining a compression code.

17. A computer-readable, non-transitory storage medium storing a program used in an information processing device for performing the processes, comprising:
holding pixel values for at least one immediately previous line in lines to be processed of an image to be decompressed;
dividing pixels of the line to be processed into $2^n$-pixel blocks;
extrapolation-estimating a $2^{n-1}$-th pixel and a $2^n$-th pixel in the divided blocks using, as reference values, values of pixels immediately above the $2^{n-1}$-th pixel and the $2^n$-th pixel in the line memory, and obtaining an estimated value in processing for a first hierarchical level;
interpolation-estimating certain pixels using, as reference values, pixel values of one immediately previous line and estimated values obtained up to processing for an immediately previous hierarchical level, and obtaining an estimated value in processing for a second hierarchical level through processing for an n-th hierarchical level; and
obtaining a quantization number from a compression code, obtaining an estimation error quantization value from the quantization number, and obtaining a pixel value of a decompressed pixel using the estimation error quantization value and the estimated value.

* * * * *

UNITED STATES PATENT AND TRADEMARK OFFICE
CERTIFICATE OF CORRECTION

PATENT NO. : 8,411,976 B2
APPLICATION NO. : 12/887014
DATED : April 2, 2013
INVENTOR(S) : Junichi Odagiri It is certified that error appears in the above-identified patent and that said Letters Patent is hereby corrected as shown below:

In the Claims:

Column 24, Line 14, Claim 16, delete "$_p$ixel" and insert -- pixel --, therefor.

Signed and Sealed this
Seventeenth Day of September, 2013

Teresa Stanek Rea
*Deputy Director of the United States Patent and Trademark Office*